(12) United States Patent
Coates et al.

(10) Patent No.: US 10,739,478 B2
(45) Date of Patent: *Aug. 11, 2020

(54) SEISMIC DATA PROCESSING

(71) Applicant: WESTERNGECO L.L.C., Houston, TX (US)

(72) Inventors: Richard T. Coates, Katy, TX (US); Darrell Coles, Katy, TX (US); Wei Dai, Sugar Land, TX (US); Kun Jiao, Katy, TX (US)

(73) Assignee: WESTERNGECO L.L.C., Houston, TX (US)

(*) Notice: Subject to any disclaimer, the term of this patent is extended or adjusted under 35 U.S.C. 154(b) by 282 days.

This patent is subject to a terminal disclaimer.

(21) Appl. No.: 15/035,884

(22) PCT Filed: Nov. 12, 2014

(86) PCT No.: PCT/US2014/065132
§ 371 (c)(1),
(2) Date: May 11, 2016

(87) PCT Pub. No.: WO2015/073487
PCT Pub. Date: May 21, 2015

(65) Prior Publication Data
US 2016/0274256 A1    Sep. 22, 2016

Related U.S. Application Data

(60) Provisional application No. 61/903,235, filed on Nov. 12, 2013.

(51) Int. Cl.
*G01V 1/28* (2006.01)

(52) U.S. Cl.
CPC ............... *G01V 1/282* (2013.01); *G01V 1/28* (2013.01); *G01V 2210/169* (2013.01); *G01V 2210/61* (2013.01); *G01V 2210/614* (2013.01)

(58) Field of Classification Search
CPC ...... G01V 1/28; G01V 1/282; G01V 2210/61; G01V 2210/614; G01V 2210/169
(Continued)

(56) References Cited

U.S. PATENT DOCUMENTS

| | | |
|---|---|---|
| 2009/0006054 A1 | 1/2009 | Song |
| 2009/0070086 A1 | 3/2009 | Le Ravelec et al. |

(Continued)

FOREIGN PATENT DOCUMENTS

WO    2012160331 A2    11/2012

OTHER PUBLICATIONS

Boonyasiriwat et al., "3D Multisource Full-Waveform Inversion using Dynamic Random Phase Encoding," SEG Technical Program Expanded Abstracts 2010, pp. 1044-1049.

(Continued)

*Primary Examiner* — Ian J Lobo
(74) *Attorney, Agent, or Firm* — Michael Guthrie

(57) ABSTRACT

Described herein are implementations of various technologies for a method for seismic data processing. The method may receive seismic data for a region of interest. The seismic data may be acquired in a seismic survey. The method may determine sparse seismic data by selecting shot points in the acquired seismic data using statistical sampling. The method may determine simulated seismic data based on an earth model for the region of interest, a reflection model for the region of interest, and the selected shot points. The method may determine an objective function that represents a mismatch between the sparse seismic data and the simulated seismic data. The method may update the reflection model using the objective function.

21 Claims, 11 Drawing Sheets

(58) Field of Classification Search
USPC .............................................. 367/73; 702/16
See application file for complete search history.

(56) References Cited

U.S. PATENT DOCUMENTS

| | | | |
|---|---|---|---|
| 2012/0143506 | A1 | 6/2012 | Routh et al. |
| 2012/0314538 | A1 | 12/2012 | Washbourne et al. |
| 2012/0316850 | A1 | 12/2012 | Liu et al. |
| 2014/0019055 | A1* | 1/2014 | Kustowski ............. G01V 1/364 702/14 |
| 2014/0372044 | A1* | 12/2014 | Jiao ........................ G01V 1/282 702/16 |

OTHER PUBLICATIONS

Dong, et al., "Least-squares reverse time migration: towards true amplitude imaging and improving the resolution," SEG Technical Program Expanded Abstracts, 2012, Sep. 2012, pp. 1-5.
Romero, et al., "Phase encoding of shot records in prestack migration," Geophysics, vol. 65, No. 2, Mar.-Apr. 2000, pp. 426-436.
Schuster, et al., "Theory of multisource crosstalk reduction by phase-encoded statics," Geophysical Journal International, vol. 184, Issue 3, 2011, pp. 1289-1303.
International Preliminary Report on Patentability for the equivalent International patent application PCT/US2014/065132, dated May 26, 2016.
Search Report for the equivalent European patent application 14861588.3, dated May 30, 2017.
Communication pursuant to Article 94(3) for the equivalent European patent application 14861588.3, dated Jun. 17, 2017.
International Search Report and Written Opinion issued in related International Application No. PCT/US2014/065132 dated Feb. 12, 2015 (10 pages).
Boonyasiriwat et al., "3D Multisource Full-Waveform Inversion using Dynamic Quasi-Monte Carlo Phase Encoding", Geophysical Research Abstracts, EGU General Assembly 2010, vol. 12, 2010.
Bunks et al., "Multiscale seismic waveform inversion", Geophysics, vol. 60, No. 5, 1995, pp. 1457-1473.
Dai et al., "Least-squares reverse time migration of marine data with frequency-selection encoding", Geophysics, vol. 78, No. 4, Jul.-Aug. 2013, pp. S233-S242.
Dai et al., "Multi-source least-squares reverse time migration", Geophysical Prospecting, vol. 60, Issue 4, Jul. 2012, pp. 681-695.
Dai et al., "Plane-wave least-squares reverse time migration", Geophysics, vol. 78, No. 4, Jul.-Aug. 2013. pp. S165-S177.
Huang et al., "Multisource least-squares migration of marine streamer and land data with frequency-division encoding", Geophysical Prospecting, vol. 60, Issue 4, Jul. 2012, pp. 663-680.
Krebs et al., "Fast full-wavefield seismic inversion using encoded sources", Geophysics, vol. 74, No. 6, Nov.-Dec. 2009, pp. WCC177-WCC188.
Plessix et al., "Application of acoustic full waveform inversion to a low-frequency large-offset land data set", Presented at the 2010 SEG Annual Meeting, Oct. 17-22, Denver, Colorado, pp. 930-934.
Schuster et al., "Theory of multisource crosstalk reduction by phase-encoded statics", Geophysical Journal International, vol. 184, 2011, pp. 1289-1303.
Van Leeuwen et al., "Fast waveform inversion without source-encoding", Geophysical Prospecting, vol. 61, Suppl. 1, 2013, pp. 10-19.
Vigh et al., "3D prestack plane-wave, full-waveform inversion", Geophysics, vol. 73, No. 5, Sep.-Oct. 2008, pp. VE135-VE144.

* cited by examiner

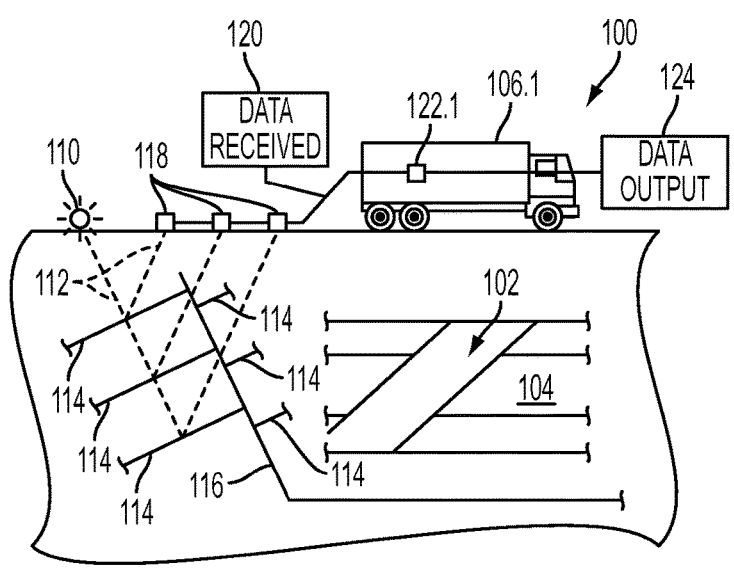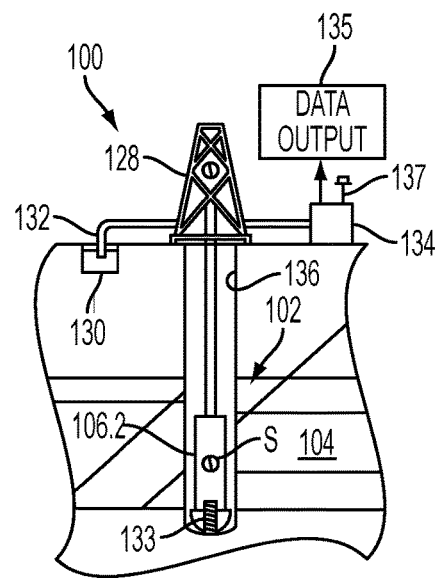
FIG. 1A  FIG. 1B
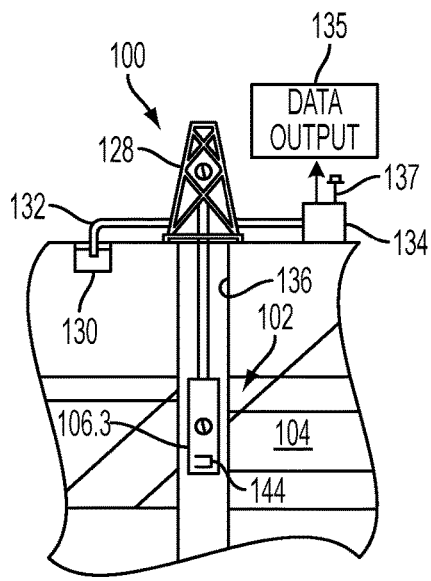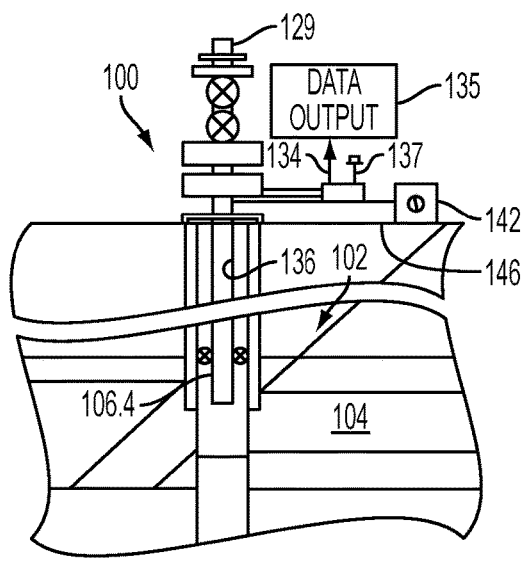
FIG. 1C  FIG. 1D

SEISMIC DATA PROCESSING

CROSS-REFERENCE TO RELATED APPLICATIONS

This application claims benefit of U.S. provisional patent application Ser. No. 61/903,235, entitled METHODS AND COMPUTING SYSTEMS FOR PROCESSING AND TRANSFORMING COLLECTED DATA FOR IMPROVED VISUALIZATION filed Nov. 12, 2013, which is herein incorporated by reference.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth along curved paths and refract and partially reflect off subsurface seismic reflectors (e.g., interfaces between subsurface layers). These propagating signals are recorded by sensors (e.g., receivers or geophones located in seismic units) laid out in a seismic spread covering a region of the earth's surface. The recorded signals may then be processed to yield a seismic survey.

Accordingly, there is a need for methods and computing systems that can employ more effective and accurate methods for identifying, isolating, and/or processing various aspects of seismic signals or other data that is collected from a subsurface region or other multi-dimensional space.

SUMMARY

In some implementations, a method for seismic data processing is provided. The method may receive seismic data for a region of interest. The seismic data may be acquired in a seismic survey. The method may determine sparse seismic data by selecting shot points in the acquired seismic data using statistical sampling. The method may determine simulated seismic data based on an earth model for the region of interest, a reflection model for the region of interest, and the selected shot points. The method may determine an objective function that represents a mismatch between the sparse seismic data and the simulated seismic data. The method may update the reflection model using the objective function.

In some implementations, the method may determine a gradient of the objective function. The method may also update the gradient of the objective function. The method may update the reflection model using the updated gradient.

In some implementations, a method for seismic data processing is provided. The method may receive seismic data for a region of interest. The seismic data may be acquired in a seismic survey. The method may sort the acquired seismic data into receiver gathers. The receiver gathers may describe a single shot point or multiple shot points that are associated with a respective receiver location. The method may determine multiple effective shot points for the region of interest using the receiver gathers. The method may determine sparse seismic data by selecting effective shot points using statistical sampling. The method may determine simulated seismic data based on an earth model for the region of interest, a reflection model for the region of interest, and the selected effective shot points. The method may determine an objective function that represents a mismatch between the sparse seismic data and the simulated seismic data. The method may update the reflection model using the objective function.

In some implementations, the method may determine a gradient of the objective function. The method may also update the gradient of the objective function. The method may update the reflection model using the updated gradient.

In some implementations, a method is provided. The method may receive survey data for a multi-dimensional region of interest. The survey data may be acquired in an imaging procedure. The method may determine sparse survey data by selecting survey points from the acquired survey data using statistical sampling. The method may determine simulated survey data based on a velocity model for the multi-dimensional region of interest, a reflection model for the multi-dimensional region of interest, and the selected survey points. The method may determine an objective function that represents a mismatch between the sparse survey data and the simulated survey data. The method may update the reflection model for the multi-dimensional region of interest using the objective function.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques, and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

FIGS. 1A-1D illustrate schematic views of oilfields in accordance with various implementations described herein.

DETAILED DESCRIPTION

Figure 2:
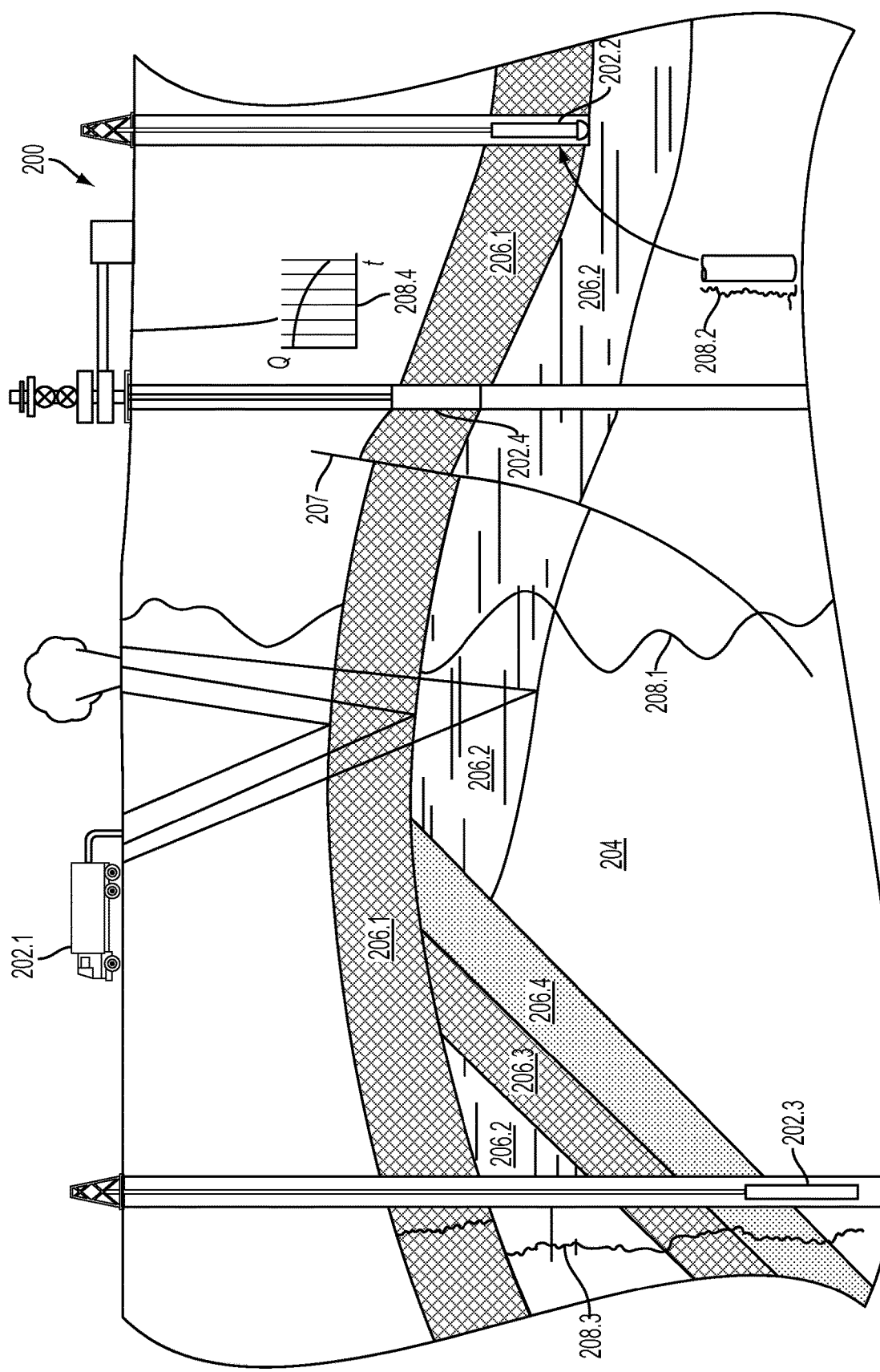
FIG. 2 illustrates a schematic view of an oilfield in accordance with various implementations described herein.

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of the invention. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a", "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises," and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Reverse time migration (RTM) may describe a process of forward modeling a seismic response of the subsurface using an earth model and a reflection model. In reverse time migration, a mismatch between observed seismic data and simulated seismic data (also called "synthetic seismic data") is measured, while an estimated reflection model may be optimized through an iterative method until the mismatch satisfies predetermined stopping criteria. Various techniques described herein are directed to updating a reflection model using statistical sampling of the observed seismic data to perform reverse time migration. Observed seismic data may be data acquired by a seismic survey as described in FIG. 5. FIG. 6 describes a method of performing reverse time migration. The section titled OIL OPERATION below describes hydrocarbon exploration or production.

Oil Operation

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

The wellbore may be drilled according to a drilling plan that is established prior to drilling. The drilling plan may set forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize portions of the field operation, such as controlling drilling, weight on bit, pump rates, or other parameters. These adjustments may be made automatically based on computer protocol, and/or manually by an operator. In some cases, well plans may be adjusted to select optimum operating conditions, or to avoid problems.

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the complete, oilfield 100 may be on land, water, and/or sea. Also, while a single field measured at a single location is depicted, oilfield applications may be utilized with any combination of one or more oilfields, one or more processing facilities and one or more wellsites.

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that provides a resistivity or other measurement of the formation at various depths.

A production decline curve or graph 208.4 is a dynamic data plot of the fluid flow rate over time. The production decline curve provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3:
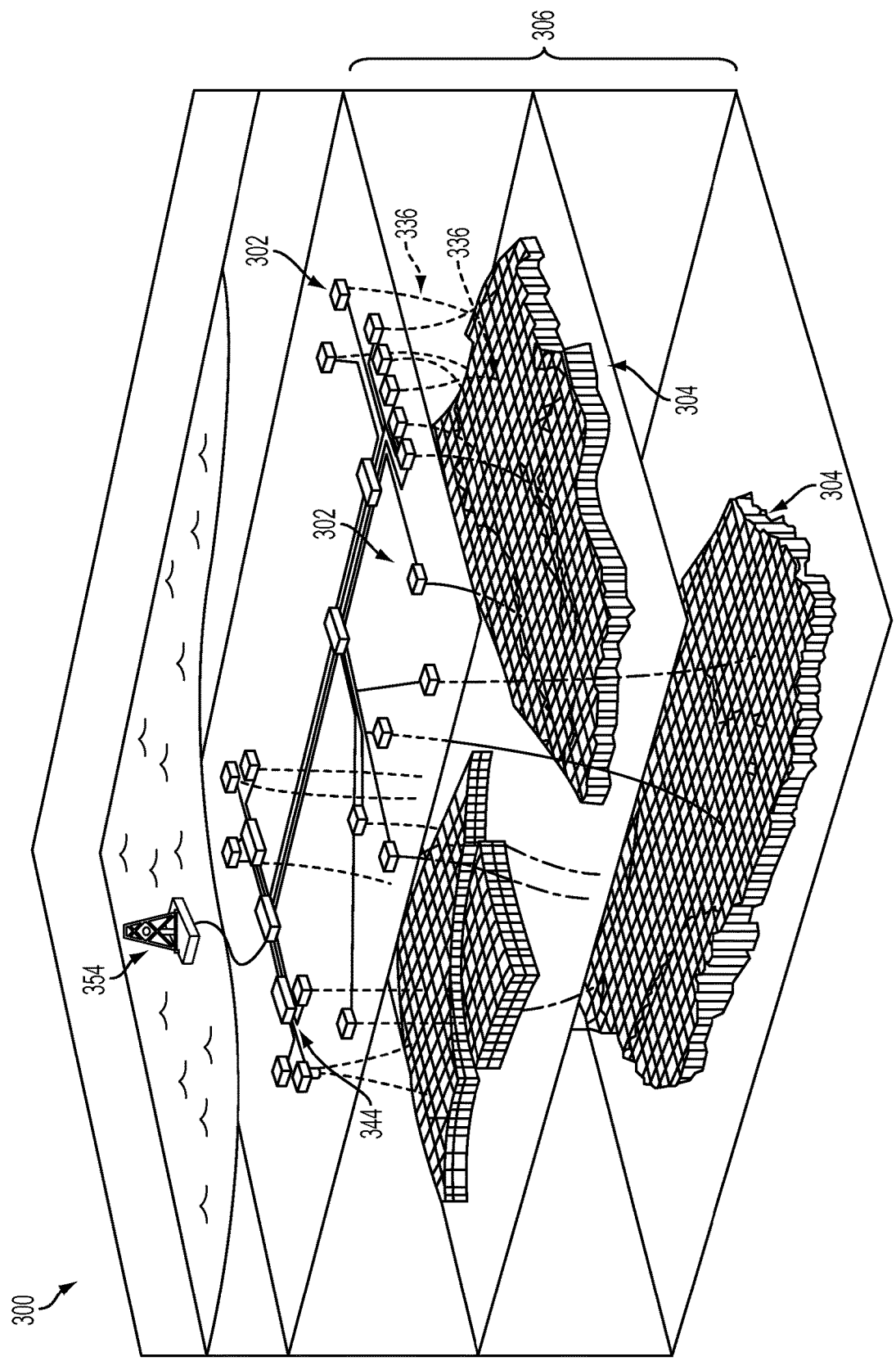
FIG. 3 illustrates an oilfield in accordance with various implementations described herein.

FIG. 3 illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3 is not intended to limit the scope of the oilfield application system. Part, or the entirety, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 4:
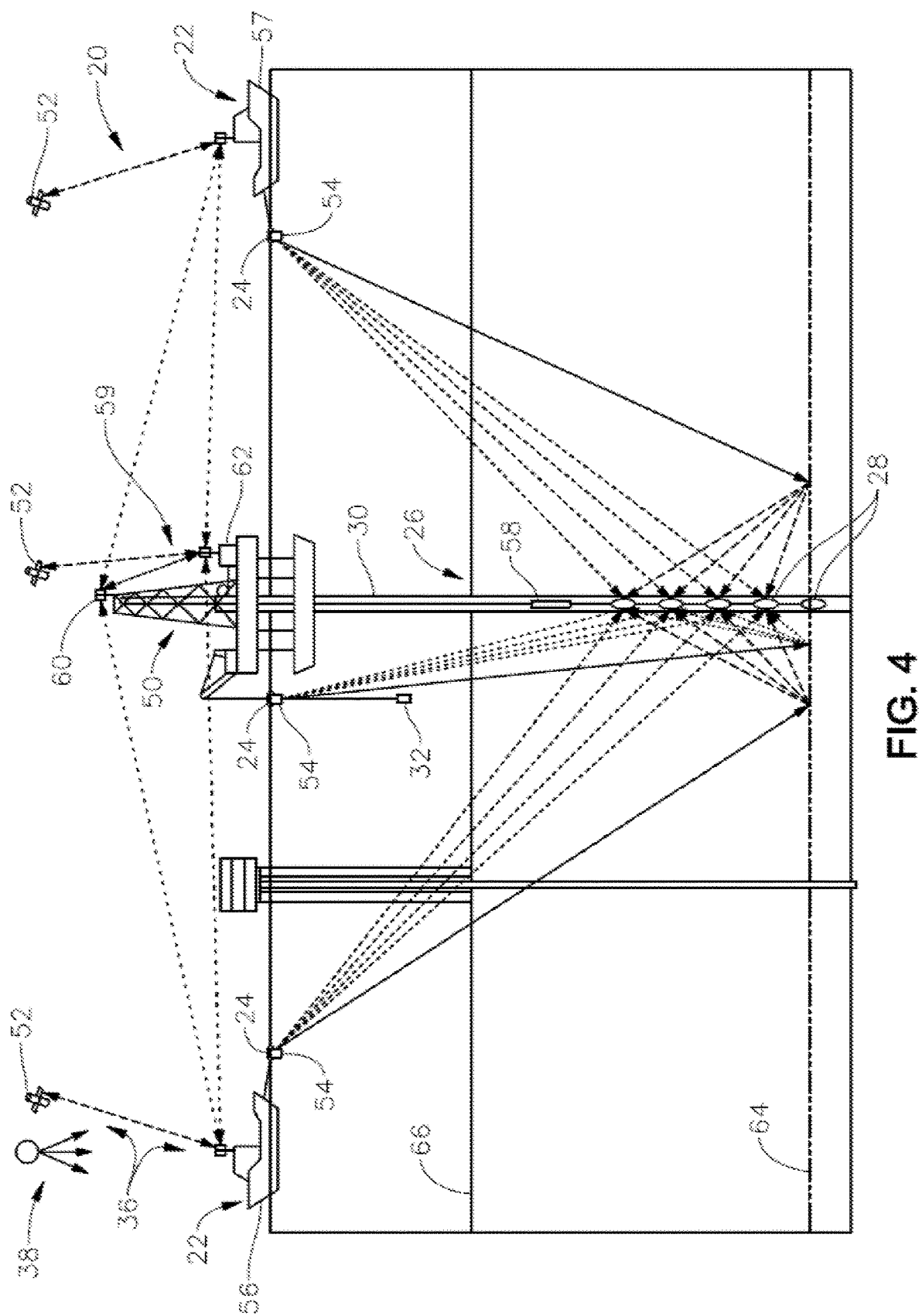
FIG. 4 illustrates a seismic system in accordance with various implementations described herein.

Attention is now directed to FIG. 4 that depicts an embodiment of seismic system 20 in which a plurality of tow vessels 22 is employed to enable seismic profiling, e.g. three-dimensional vertical seismic profiling or rig/offset vertical seismic profiling. In FIG. 4, a marine system is illustrated as including a rig 50, a plurality of vessels 22, and one or more acoustic receivers 28. Although a marine system is illustrated, other embodiments of the disclosure may not be limited to this example. A person of ordinary skill in the art will recognize that teachings of the disclosure may be used in land or offshore systems. However, offshore systems are described herein to simplify the disclosure and to facilitate explanation.

Although two vessels 22 are illustrated in FIG. 4, a single vessel 22 with multiple source arrays 24 or multiple vessels 22 each with single or multiple sources 24 may be used. In some applications, at least one source/source array 24 may be located on the rig 50 as represented by the rig source in FIG. 4. As the vessels 22 travel on predetermined or systematic paths, their locations may be recorded through the use of navigation system 36. In some cases, the navigation system 36 utilizes a global positioning system (GPS) 38 to record the position, speed, direction, and other parameters of the tow vessels 22.

As illustrated, the global positioning system 38 may utilize or work in cooperation with satellites 52 which operate on a suitable communication protocol, e.g. VSAT communications. The VSAT communications may be used, among other things, to supplement VHF and UHF communications. The GPS information can be independent of the VSAT communications and may be input to processing system or other suitable processors to predict the future movement and position of the vessels 22 based on real-time information. In addition to predicting future movements, the processing system also can be utilized to provide directions and coordinates as well as to determine initial shot times, as described above. Control system 34 effectively utilizes processing system in cooperation with source controller and synchronization unit to synchronize the sources 24 with the downhole data acquisition system 26.

As illustrated, the one or more vessels 22 each tow one or more acoustic sources/source arrays 24. The source arrays 24 include one or more seismic signal generators 54, e.g. air guns, configured to create a seismic/sonic disturbance. In the embodiment illustrated, the tow vessels 22 comprise a master source vessel 56 (Vessel A) and a slave source vessel 57 (Vessel B). However, other numbers and arrangements of tow vessels 22 may be employed to accommodate the parameters of a given seismic profiling application. For example, one source 24 may be mounted at rig 50 (see FIG. 4) or at another suitable location, and both vessels 22 may serve as slave vessels with respect to the rig source 24 or with respect to a source at another location.

However, a variety of source arrangements and implementations may be provided as desired for a given application. When utilizing dithered timing between the sources, for example, the master and slave locations of the sources can be adjusted according to the parameters of the specific seismic profiling application. In some applications, one of the source vessels 22 (e.g. source vessel A in FIG. 4) may serve as the master source vessel while the other source vessel 22 serves as the slave source vessel with dithered firing. However, an alternate source vessel 22 (e.g. source vessel B in FIG. 4) may serve as the master source vessel while the other source vessel 22 serves as the slave source vessel with dithered firing.

Similarly, the rig source 22 may serve as the master source while one of the source vessels 22 (e.g. vessel A) serves as the slave source vessel with dithered firing. The rig source 22 also may serve as the master source while the other source vessel 22 (e.g. vessel B) serves as the slave source vessel with dithered firing. In some applications, the rig source 22 may serve as the master source while both of the source vessels 22 serve as slave source vessels each with dithered firings. These and other arrangements may be used in achieving the desired synchronization of sources 22 with the downhole acquisition system 26.

The acoustic receivers 28 of data acquisition system 26 may be deployed in borehole 30 via a variety of delivery systems, such as wireline delivery systems, slickline delivery systems, and other suitable delivery systems. Although a single acoustic receiver 28 could be used in the borehole 30, the illustrated embodiment comprises a plurality of receivers 28 that may be located in a variety of positions and orientations. The acoustic receivers 28 may be configured for sonic and/or seismic reception. Additionally, the acoustic receivers 28 may be communicatively coupled with processing equipment 58 located downhole. By way of example, processing equipment 58 may comprise a telemetry system for transmitting data from acoustic receivers 28 to additional processing equipment 59 located at the surface, e.g. on the rig 50 and/or vessels 22.

Depending on the specifics of a given data communication system, examples of surface processing equipment 59 may comprise a radio repeater 60, an acquisition and logging unit 62, and a variety of other and/or additional signal transfer components and signal processing components. The radio repeater 60 along with other components of processing equipment 59 may be used to communicate signals, e.g. UHF and/or VHF signals, between vessels 22 and rig 50 and to enable further communication with downhole data acquisition system 26.

It should be noted the UHF and VHF signals can be used to supplement each other. In general, the UHF band supports a higher data rate throughput but can be susceptible to obstructions and has less range. The VHF band is less susceptible to obstructions and has increased radio range but its data rate throughput is lower. In FIG. 4, for example, the VHF communications are illustrated as "punching through" an obstruction in the form of a production platform.

In some applications, the acoustic receivers 28 are coupled to surface processing equipment 59 via a hardwired connection. In other embodiments, wireless or optical connections may be employed. In still other embodiments, combinations of coupling techniques may be employed to relay information received downhole via the acoustic receivers 28 to an operator and/or control system, e.g. control system, located at least in part at the surface.

In addition to providing raw or processed data uphole to the surface, the coupling system, e.g. downhole processing equipment 58 and surface processing equipment 59, may be designed to transmit data or instructions downhole to the acoustic receivers 28. For example, the surface processing equipment 59 may comprise synchronization unit 42 which coordinates the firing of sources 24, e.g. dithered (delayed) source arrays, with the acoustic receivers 28 located in borehole 30. According to one embodiment, the synchronization unit uses coordinated universal time to ensure accurate timing. In some cases, the coordinated universal time system 4 is employed in cooperation with global positioning system 38 to obtain UTC data from the GPS receivers of GPS system 38.

FIG. 4 illustrates one example of a system for performing seismic profiling that can employ simultaneous or near-simultaneous acquisition of seismic data. By way of example, the seismic profiling may comprise three-dimensional vertical seismic profiling but other applications may utilize rig/offset vertical seismic profiling or seismic profiling employing walkaway lines. An offset source can be provided by a source 24 located on rig 50, on a stationary vessel 22, and/or on another stationary vessel or structure.

As an example, the overall seismic system 20 may employ various arrangements of sources 24 on vessels 22 and/or rig 50 with each location having at least one source/source array 24 to generate acoustic source signals. The acoustic receivers 28 of downhole acquisition system 26 are configured to receive the source signals, at least some of which are reflected off a reflection boundary 64 located beneath a sea bottom 66. The acoustic receivers 28 generate data streams that are relayed uphole to a suitable processing system, e.g. processing system, via downhole telemetry/processing equipment 58.

While the acoustic receivers 28 generate data streams, the navigation system 36 determines a real-time speed, position, and direction of each vessel 22 and also estimates initial shot times accomplished via signal generators 54 of the appropriate source arrays 24. The source controller may be part of surface processing equipment 59 (located on rig 50, on vessels 22, or at other suitable locations) and is designed to control firing of the acoustic source signals so that the timing of an additional shot time (e.g. a shot time via slave vessel 57) is based on the initial shot time (e.g. a shot time via master vessel 56) plus a dither value.

The synchronization unit of, for example, surface processing equipment 59, coordinates the firing of dithered acoustic signals with recording of acoustic signals by the downhole acquisition system 26. Processor system is configured to separate a data stream of the initial shot and a data stream of the additional shot via the coherency filter. As discussed above, however, other embodiments may employ pure simultaneous acquisition and/or may not perform separation of the data streams. In such cases, the dither is effectively zero.

After an initial shot time at T=0 (T0) is determined, subsequent firings of acoustic source arrays 24 may be offset by a dither. The dithers can be positive or negative and sometimes are created as pre-defined random delays. Use of dithers facilitates the separation of simultaneous or near-simultaneous data sets to simplify the data processing. The ability to have the acoustic source arrays 24 fire in simultaneous or near-simultaneous patterns reduces the overall amount of time used for three-dimensional vertical seismic profiling source acquisition. This, in turn, reduces rig time. As a result, the overall cost of the seismic operation is reduced, rendering the data intensive process much more accessible.

If the acoustic source arrays used in the seismic data acquisition are widely separated, the difference in move-outs across the acoustic receiver array of the wave fields generated by the acoustic sources 24 can be sufficient to obtain a clean data image via processing the data without further special considerations. However, even when the acoustic sources 24 are substantially co-located in time, data acquired by any of the methods involving dithering of the firing times of the individual sources 24 described herein can be processed to a formation image leaving hardly any artifacts in the final image. This is accomplished by taking advantage of the incoherence of the data generated by one acoustic source 24 when seen in the reference time of the other acoustic source 24.

First Migration Implementation

Figure 5:
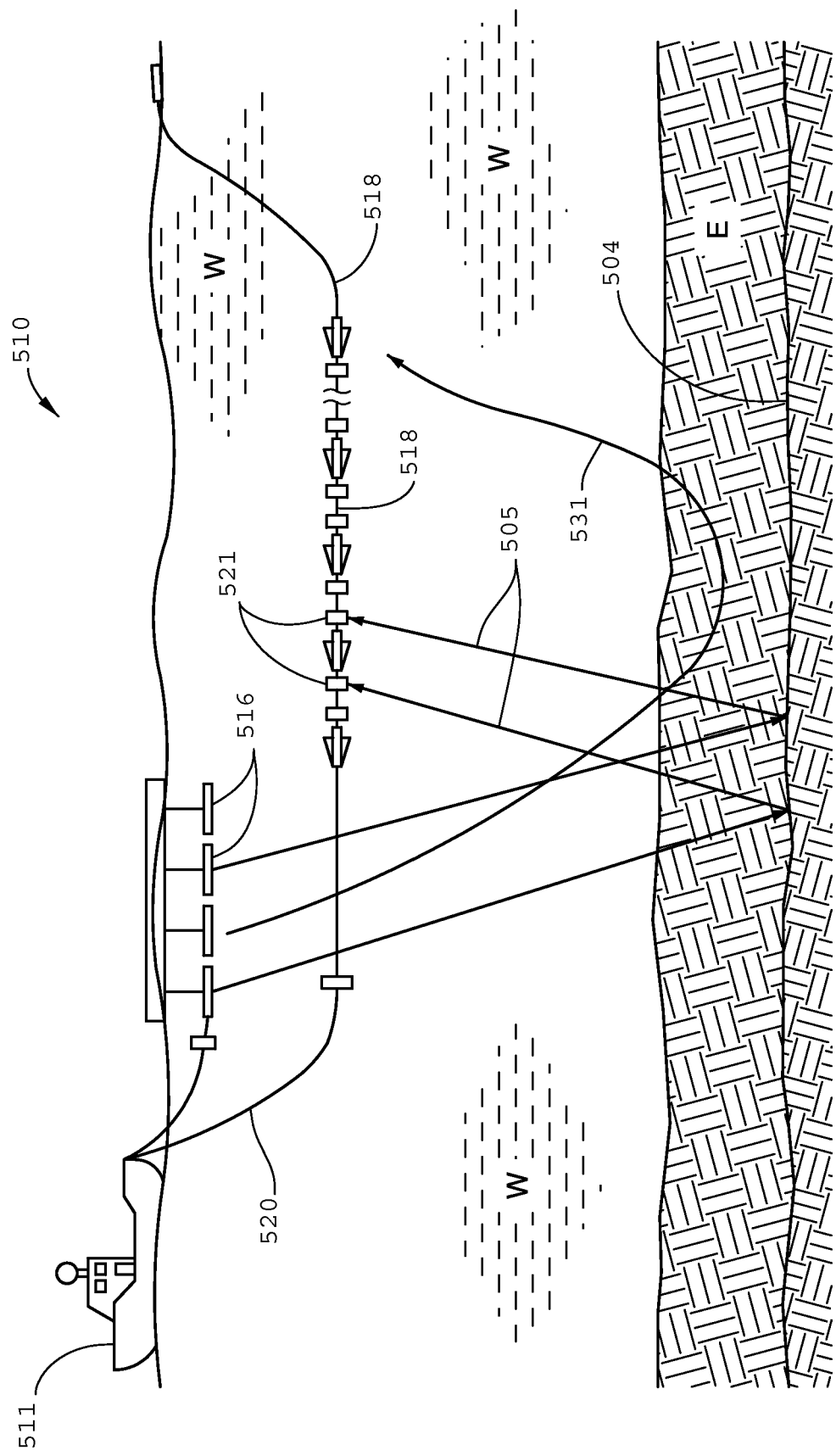
FIG. 5 illustrates a diagrammatic view of marine seismic surveying in accordance with various implementations described herein.
Figure 6:
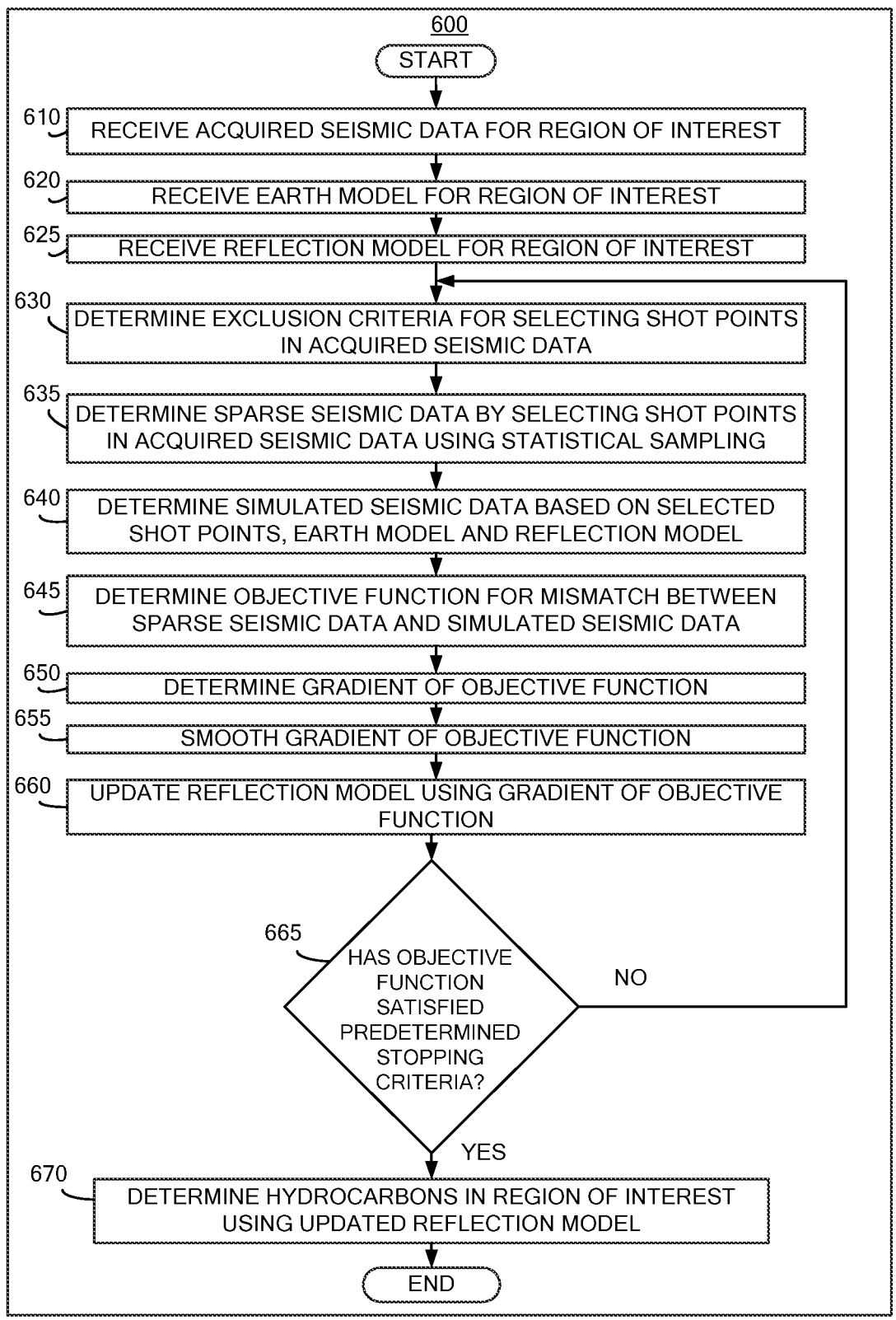
FIG. 6 illustrates a flow diagram of a method for processing seismic data in accordance with various implementations described herein.

FIG. 5 illustrates a diagrammatic view of marine seismic surveying 510 in connection with implementations of various techniques described herein. A marine seismic acquisition system 510 may include a vessel 511 carrying control components and towing a plurality of seismic sources 516 and a plurality of streamers 518 equipped with seismic receivers 521. The seismic sources 516 may include a single type of source, or different types. The sources may use any type of seismic generator, such as air guns, water guns, steam injection sources, controllable seismic sources, explosive sources such as dynamite or gas injection followed by detonation and the like. The streamers 518 may be towed by means of their respective lead-ins 520, which may be made from high strength steel or fiber-reinforced cables that convey electrical power, control, and data signals between the vessel 511 and the streamers 518. An individual streamer may include a plurality of seismic receivers 521 that may be distributed at spaced intervals along the streamer's length. The seismic receivers 521 may include hydrophone sensors as well as multi-component sensor devices, such as accelerometers. Further, the streamers 518 may include a plurality of inline streamer steering devices (SSDs), also known as "birds." The SSDs may be distributed at appropriate intervals along the streamers 518 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 516 and the seismic streamers 518 may be deployed from the vessel 511 and towed slowly to traverse a region of interest. The seismic sources 516 may be periodically activated to emit seismic energy in the form of an acoustic or pressure wave through the water. The sources 516 may be activated individually or substantially simultaneously with other sources. The acoustic wave may result in one or more seismic wavefields that travel coherently into the earth E underlying the water W. As the wavefields strike interfaces 504 between earth formations, or strata, they may be reflected and/or refracted back through the earth E and water W along paths 505 to the various receivers 521 where the wavefields (e.g., pressure waves in the case of air gun sources) may be converted to electrical signals, digitized and transmitted to the integrated computer-based seismic navigation, source controller, and recording system in the vessel 511 via the streamers 518 and lead-ins 520. For instance, a refracting or diving wave path 531 is shown passing through the earth E and water W from the sources 516 to the seismic receivers 521. Through analysis of these detected signals, it may be possible to determine the shape, position and lithology of the sub-sea formations, including those formations that may include hydrocarbon deposits. While a marine seismic survey is described in regard to FIG. 5, implementations of various techniques described herein may also be used in connection to a land seismic survey.

FIG. 6 illustrates a flow diagram of a method 600 for processing seismic data in accordance with various implementations described herein. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted.

At block 610, acquired seismic data are received for a region of interest (i.e., "the received seismic data" and also called "observed seismic data"). For instance, the acquired seismic data may correspond to one or more shot points (also called "shot records") from a seismic survey as described in FIG. 5. A shot point may describe seismic data that is obtained from firing one or more seismic sources at a particular shot location during a seismic survey. The region of interest may include an area of the subsurface in the earth that may be of particular interest, such as for hydrocarbon production.

At block 620, an earth model may be received for the region of interest (i.e., "the received earth model"). The received earth model may include elastic properties for specific regions in the subsurface of the earth. Elastic properties may include density, P-velocity (Vp) or velocity of the primary wave, S-velocity (Vs) or velocity of the shear wave, acoustic impedance, shear impedance, Poisson's ratio, elastic stiffness, elastic compliances, or a combination thereof. In one implementation, the earth model may be a velocity model that describes the propagation of seismic waves between reflection points in the region of interest.

In another implementation, the earth model may be obtained by performing a full-waveform inversion on the received seismic data from block 610.

At block 625, a reflection model may be received for the region of interest (i.e., "the received reflection model" or "the reflectivity model"). The received reflection model may describe the propagation or scattering of seismic waves in response to reflection interfaces inside the region of interest. For instance, the received reflection model may provide the boundaries of reflection interfaces inside the region of interest.

Furthermore, the reflection model may demonstrate rapid spatial variation in the region of interest, while the earth model may demonstrate slow spatial variation in the region of interest. As such, different wavelengths of seismic waves may be used to determine the spatial variation for either the earth model or the reflection model.

The received reflection model may describe one or more reflection events. A reflection event may describe how an incidental seismic wave interacts with a reflection interface in the subsurface, and reflection events may correspond to specific reflection properties. Reflection properties may include the time that a particular reflection occurs, the slope of a reflection interface, the curvature of a reflection interface and other properties corresponding to reflection events.

In one implementation, the received reflection model may be obtained using a reverse time migration algorithm. In the reverse time migration algorithm, seismic waves may propagate reflection events downward and upward through the subsurface using the earth model. The reverse time migration algorithm may use a partial or a complete selection of the shot points that correspond to the acquired seismic data from block 610. For more information regarding reverse time migration, see block 640 below.

In another implementation, the received reflection model may be obtained in an initial iteration of blocks 630-665 below. For instance, block 625 may be omitted from method 600 and an empty or zeroed reflection model may be used at blocks 630-665 in the initial iteration. The updated reflection model at block 660 may be used as the received reflection model in the next iteration of block 630-665.

At block 630, one or more exclusion criteria may be determined for sampling the acquired seismic data. The exclusion criteria may include one or more rules that provide for selecting or excluding shot points and their corresponding seismic data from an acquired seismic dataset. For instance, the exclusion criteria may limit the number of shot points that may be randomly or pseudorandomly selected within a predetermined proximity of another shot point in a particular geographic area or survey area. In one implementation, the exclusion criteria may include an exclusion radius that provides a predetermined minimum distance between sampled shot points. The predetermined minimum distance may limit statistical sampling to shot points in the acquired seismic data that are outside a predetermined minimum distance from a previously selected shot point. If method 600 selects an invalid shot point (i.e., one that violates the exclusion criteria), method 600 may ignore that selection and randomly select another shot point from the acquired seismic data until a valid shot point is selected.

The exclusion radius may be determined based on one or more factors. For instance, the exclusion radius may be based on reducing the acquired seismic data down to a predetermined size. If a reduction in the acquired seismic data is desired (e.g., a sparse dataset that is 10% of the original size of the acquired seismic data), the exclusion radius may be determined such that the acquired seismic data is sampled to produce a predetermined number of shot points corresponding to the desired size of a sparse seismic dataset.

The exclusion radius may also be determined to achieve a predetermined sampling frequency of shot points in the inline and/or crossline directions of a seismic survey (i.e., to achieve a predetermined inline sampling or crossline sampling). This predetermined sampling frequency may be chosen to produce or prevent a non-aliased sparse seismic dataset. Aliasing may occur when the sampling frequency of a survey shot distribution is less than the Nyquist frequency of the pressure waves emitted by the seismic sources. For more information regarding an exclusion radius, see FIGS. 7A-7B below.

In another implementation, the exclusion criteria may include using a grid of seismic cells to select shot points in the acquired seismic data. For instance, the acquired seismic data from block 610 may be divided into a grid of seismic data cells. The exclusion criteria may limit statistical sampling of the acquired seismic data to a predetermined number of shot points within a respective seismic cell in the grid (e.g., selecting a single shot point from a respective seismic cell in the grid). For more information regarding exclusion criteria using a grid of seismic cells, see FIG. 7C below.

At block 635, sparse seismic data may be determined from the acquired seismic data at 610 using statistical sampling. In statistical sampling, data points may be randomly or pseudo-randomly selected to provide an estimate of a larger dataset. For instance, shot points corresponding to the acquired seismic data may be randomly selected to produce sparse seismic data. In one implementation, the acquired seismic data may be sampled using a sampling frequency to prevent aliasing in the sparse seismic data.

Furthermore, the determined exclusion criteria from block 630 may be used to limit which shot points for the acquired seismic data may be sampled. Without using exclusion criteria, the statistical sampling of the acquired seismic data may result in a problematic dataset. In one situation, the sparse seismic data may have a disproportionate number of shot points selected from one survey region of the acquired seismic data, while selecting insufficient shot points in other regions of the acquired seismic data. In another situation, two or more shot points in the sparse seismic data may be closely-spaced together, which may provide little additional information to the method 600. Either situation may result in more iterations and added computational costs to satisfy one or more predetermined stopping criteria at block 665 below.

In one implementation, the exclusion criteria may include eliminating shot points that were already selected in a previous iteration of method 600 from the sampling process at block 635. Iterations may refer to repetitions of one or more of blocks 635-665 based on whether the objective function has satisfied one or more predetermined stopping criteria, such as convergence of the objective function. However, eliminating previously used shot points from the statistical sampling at block 635 may increase the number of unique shot points used in method 600, i.e., increasing the percentage of shot points from the original acquired seismic data that are used at least once in method 600.

In another implementation, selected shot points may be reused in different iterations. For instance, if a particular shot point is sampled to produce sparse seismic data in one iteration, the same shot point may be replaced or made available for use in the next or a future iteration. This may allow shot points and their corresponding seismic data to be used in multiple iterations in method 600. As such, the number of available shot points for sampling may remain constant.

In another implementation, the number of shot points sampled at block 635 may remain constant during subsequent iterations of method 600. This may result in a fixed size of the sparse seismic data for each iteration. Furthermore, the exclusion criteria, e.g., the exclusion radius, may remain the same between iterations in order to sample the same number of shot points as the previous iterations.

In another implementation, the number of shot points sampled at block 635 may be increased by a predetermined amount in subsequent iterations of method 600. As such, early iterations may have less computational costs than later iterations that sample more shot points of the acquired seismic data. As the number of selected shot points increase during method 600, the exclusion criteria may be updated accordingly. For instance, if the exclusion criteria include an exclusion radius, the predetermined minimum distance may be decreased in later iterations to provide for randomly selecting more shot points. If the exclusion criteria include a grid of seismic cells, the size of a respective seismic cell may be decreased to increase the number of selected shot points.

Figure 7A:
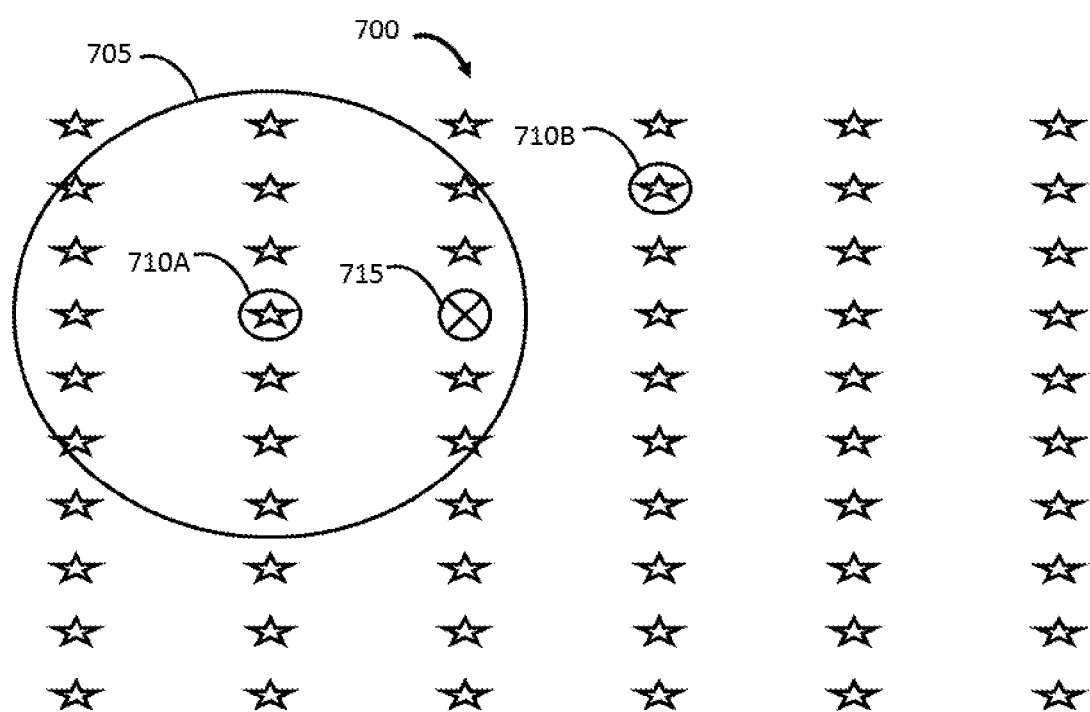
FIG. 7A illustrates an example of statistically sampling shot points from a survey shot distribution in accordance with various implementations described herein.
Figure 7B:
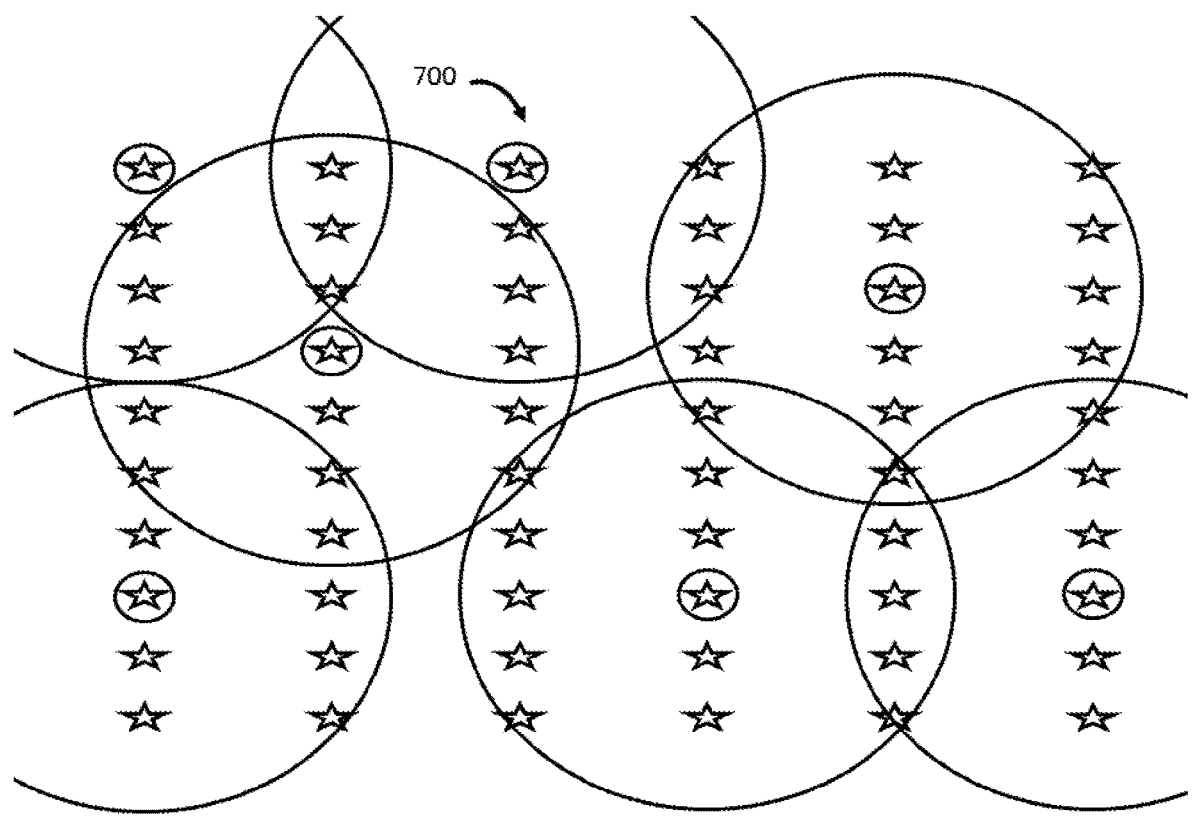
FIG. 7B illustrates an example of statistically sampling shot points from a survey shot distribution in accordance with various implementations described herein.
Figure 7C:
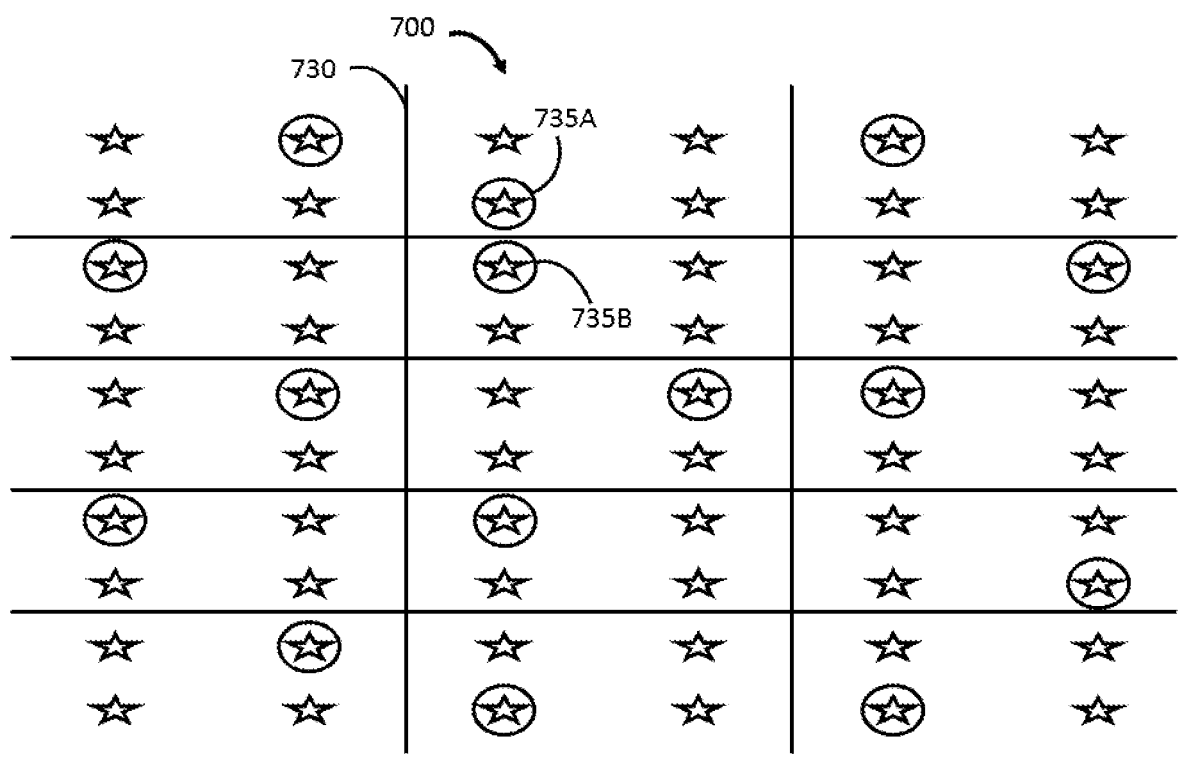
FIG. 7C illustrates an example of statistically sampling shot points from a survey shot distribution in accordance with various implementations described herein.

FIGS. 7A-7C illustrate various examples of statistically sampling shot points from a survey shot distribution 700 in accordance with various implementations described herein. As shown in FIG. 7A, a shot point 710A is randomly selected from the survey shot distribution 700. An exclusion radius 705 is determined that corresponds to the randomly selected shot point 710A. The exclusion radius 705 may provide the extent of the area in the survey shot distribution 700 where future shot points may not be selected from. As such, the next valid shot point may be shot point 710B that is selected outside the exclusion radius 705. Shot point 715, by being inside the exclusion radius 705, may be an invalid shot point and excluded from being in the sparse seismic data.

FIG. 7B illustrates a subset of shot points that are randomly selected from the survey shot distribution 700 without any two shot points being within the exclusion radius of another shot point. The randomly selected shot points in FIG. 7B may provide an example of the sparse seismic data determined at block 635.

FIG. 7C illustrates a survey shot distribution over a survey area in accordance with various implementations described herein. As shown, the survey shot distribution 700 is divided into a grid 730 of respective seismic cells. While the respective seismic cells are shown to include four shot points, other implementations are envisioned with more or fewer shot points positioned in the respective seismic cells. Keeping with FIG. 7C, some instances may occur where two shot points (e.g., shot points 735A and 735B) are randomly selected next to one another. However, the grid 730 may prevent an over-representation of data from a particular area in survey shot distribution 700 by providing a balanced selection of shot points.

Returning to FIG. 6, at block 640, simulated seismic data may be determined based on the selected shot points corresponding to the sparse seismic data, the received earth model, and the received reflection model. For instance, the simulated seismic data may be determined by performing a computer simulation of a seismic survey using the received earth model and the received reflection model. The simulated seismic data may be based on the Born approximation, where modelling the propagation of a seismic wave includes limiting the interaction between the seismic wave and a reflection interface or reflection point to a single instance. Furthermore, by using one or more selected shot points, a seismic wave may be forward modeled from the selected shot points through the subsurface to the receivers in a seismic acquisition system. The selected shot points that are used in the simulated seismic survey may be the same shot points that were selected for the sparse seismic data at block 635.

At block 645, an objective function is determined. The objective function may represent the mismatch between acquired seismic data and simulated seismic data based on the received reflection model. As such, the objective function may refer to the relationship between the acquired seismic data and the simulated seismic data, as described in Equation 1 below, and/or the measured mismatch between the acquired seismic data and the simulated seismic data.

Furthermore, the objective function may provide a solution to a seismic inverse problem, such as one used for reverse time migration. In reverse time migration, a forward modeling operator $F_v(r)$ using the received earth model may map the received reflection model over an inversion domain $\Omega$ to a data domain, thereby producing forward modeled data. To obtain a solution for the inverse problem, reverse time migration may include an optimization process to minimize the mismatch $f(r)$ between the forward modeled data and observed seismic data, as described by the objective function. For instance, the objective function may be a least-squares objective function that may be expressed by the following equation:

$$\min f(r) = \tfrac{1}{2} \Sigma_S \Sigma_R \|F_v(r) - d_{acq}\|^2 \qquad \text{Equation 1}$$

where r includes reflection parameters from the received reflection model, S refers to selected shot points from a seismic survey, R refers to selected receivers from a seismic survey, $F_v(r)$ is the forward modeling operator that maps the seismic response of the subsurface using the received earth model and the received reflection model, and $d_{acq}$ is the observed seismic data. $F_v(r)$ may be the simulated seismic data from block 640 and $d_{acq}$ may be the sparse seismic data from block 635. S may include the shot points selected using statistical sampling at block 635. While a least-squares norm is used in Equation 1, other objective functions may use norms besides the least-squares norm, such as an absolute norm, a student-t norm, a triangular norm, and any other applicable norm functions for determining the mismatch between the observed seismic data and the simulated seismic data.

In one implementation, the objective function may be a regularized objective function. Regularization may be used to stabilize the solution of an objective function for a seismic inverse problem by reducing the size of the possible null space for the seismic inverse problem, which may reduce the amount of possible solutions. Regularization may include introducing a priori information into an objective function. A priori information may include inferences about an inverse problem that may be made based on the particular physics of the problem, such as the natural bedding process of the subsurface. In one implementation, a regularized objection function may be expressed by the following equation:

$$\min f(r) = \frac{1}{2} \sum_S \sum_R \|F_v(r) - d_{acq}\|^2 + Reg(r) \qquad \text{Equation 2}$$

where r includes properties from the reflection model, $F_v(r)$ is the forward-modeled seismic response based on the received earth model and the received reflection model, $d_{acq}$ is the observed seismic data, S refers to selected shot points from a seismic survey, R refers to selected receivers from a seismic survey, and Reg(r) is regularization function based on the reflection model and a priori information. Reg(r) may be specified using the following equation:

$$Reg(r) = \frac{1}{2} \int_\Omega h[\|\nabla r\|^2] \qquad \text{Equation 3}$$

where $\Omega$ is the seismic inversion domain, r includes parameters of the received reflection model, $\nabla r$ is the spatial gradient vector of the model parameter r, and h describes a compactly supported infinitely differentiable function.

At block 650, the gradient of the objective function may be determined. For instance, in reverse time migration, the gradient of the objective function g(r) may be expressed by the following equation:

$$g(r) = \nabla f(r) \quad \text{Equation 4}$$

The gradient g(r) may be computed by any applicable method, such as the adjoint-state formulation. For instance, in an adjoint-state formulation, state variables (e.g., the seismic wavefield variables) may be computed by forward modeling the seismic response of the subsurface. Then, an adjoint source may be computed for the state variables and the objective function. Next, the adjoint state variables (e.g., the seismic wavefields from the adjoint source) may be computed by backward modeling the seismic wavefields. Finally, the gradient of the objective function may be computed using the state variables and the adjoint state variables.

At block 655, the gradient of the objective function may be smoothed (i.e., "the updated gradient of the objective function" or "the pre-conditioned gradient"). For instance, the gradient of the objective function based on the sparse seismic data and the simulated seismic data may include missing or inaccurate values from using a sparse portion of the acquired seismic data from block 610. As such, smoothing the gradient may remove "source foot-print" effects. An unsmoothed gradient may also be prone to converging to local minima at block 665 below. The gradient may be smoothed at block 655 using Tikhonov regularization, a total variation regulation, or any other type of smoothing process. Smoothing parameters for block 655 may be based on the spacing of selected shot points in the sparse seismic data or the source frequency bandwidth as used in the seismic survey to obtain the acquired seismic data.

At block 660, the received reflection model may be updated using the gradient of the objective function from blocks 650 or 655. The received reflection model may be updated iteratively, such as according to the rule $r_{k+1} = r_k + a_k p_k$, where $r_k$ is the received reflection model at iteration k, $a_k$ is the step size or length determined by a line search procedure with the search direction $p_k$, and $r_{k+1}$ is the updated reflection model. The search direction $p_k$ may be selected using the updated gradient of the objective function and the selected optimization technique that is being used, such as one of steepest descent, conjugate gradient, or Newton/quasi-Newton directions. The step length corresponds to the amount of change for model parameters in the updated reflection model.

The received earth model from block 620 may be a background model in iterations of block 630-665. As such, while the received reflection model may be updated during a particular iteration, the received earth model may remain constant or unchanged between iterations.

At block 665, it may be determined whether the objective function has satisfied one or more predetermined stopping criteria. For instance, the objective function may be analyzed for whether it has converged to a value or stopped decreasing from one iteration to the next iteration. The predetermined stopping criteria may be a specified threshold where convergence occurs, such as when the difference between the sparse seismic data from block 635 and the simulated seismic data from block 640 is below the specified threshold. The specified threshold may be submitted by a user. The specified threshold may be based on the noise level of the received seismic data. In another instance, the specified threshold may be a point determined by a user where method 600 introduces geologically implausible features into the gradient from block 650, such as due to method 600 attempting to fit the seismic data to noise. Specified thresholds may also include quality control (QC) criteria, such as the flatness of the image gather.

If the objective function satisfies the predetermined stopping criteria, the process may proceed to block 670. If the objective function fails to satisfy the predetermined stopping criteria, the process may return to block 630 to repeat one or more of blocks 630-665 using the updated reflection model from block 660 in place of the received reflection model from block 625.

At block 670, the updated reflection model may be used to determine the presence of hydrocarbons in the region of interest. For instance, the updated reflection model may be used to facilitate hydrocarbon exploration or production. In one implementation, a petrophysical model may be estimated based on a final reflection model from block 665. The petrophysical model may include various petrophysical properties that describe the region of interest such as the amount of shale (Vshale), the elastic moduli of composite rock or the density of the solid phase of rock. For more information regarding hydrocarbon exploration or production, see the section titled OIL OPERATION above.

In some implementations, a method for seismic data processing is provided. The method may receive seismic data for a region of interest. The seismic data may be acquired in a seismic survey. The method may determine sparse seismic data by selecting shot points in the acquired seismic data using statistical sampling. The method may determine simulated seismic data based on an earth model for the region of interest, a reflection model for the region of interest, and the selected shot points. The method may determine an objective function that represents a mismatch between the sparse seismic data and the simulated seismic data. The method may update the reflection model using the objective function.

In some implementations, the method may determine a gradient of the objective function. The method may also update the gradient of the objective function. The method may update the reflection model using the updated gradient. The method may also iteratively update the reflection model and the gradient of the objective function until the objective function satisfies predetermined stopping criteria or converges. Updating the gradient of the objective function may include smoothing the gradient of the objective function.

In some implementation, the reflection model may be obtained using a reverse time migration algorithm. The reflection model may be obtained in an initial iteration of updating the reflection model based on the objective function. The reflection model may describe the propagation of seismic waves in response to reflection interfaces in the region of interest. One of the selected shot points may have been selected in a previous iteration for updating the reflection model. One of the selected shots points may have been excluded from being selected in a future iteration for updating the reflection model. The objective function may correspond to a least squares norm. The earth model may be a velocity model that describes the propagation of seismic waves between reflection points in the region of interest. The earth model may include one or more elastic properties, such as density, P-velocity (Vp), S-velocity (Vs), acoustic impedance, shear impedance, Poisson's ratio, elastic stiffness, or elastic compliances. The reflection model may include one or more reflection properties, such as the time of a reflection, the slope of a reflection interface, or the curvature of a reflection interface. The method may use the updated reflection model to facilitate hydrocarbon exploration or production.

In some implementations, the method may determine an exclusion criterion that provides rules for selecting shot points in the acquired seismic data. The selected shot points may be selected based on the exclusion criterion. The exclusion criterion may include an exclusion radius. The exclusion radius may provide a predetermined minimum distance between selected shot points in the sparse seismic data. The exclusion radius may be based on reducing the acquired seismic data down to a predetermined size. The exclusion radius may be based on selecting a predetermined sampling frequency of shot points to produce a non-aliased seismic dataset. The method may divide the acquired seismic data into a grid of seismic data cells for the exclusion criterion. The sparse seismic data may be determined by selecting a single shot point in a respective seismic data cell in the grid. The method may select shot points in a manner that would prevent aliasing in the sparse seismic data.

In some implementations, an information processing apparatus for use in a computing system is provided, and includes means for receiving seismic data for a region of interest. The seismic data may be acquired in a seismic survey. The information processing apparatus may also have means for determining sparse seismic data by selecting shot points from the acquired seismic data using statistical sampling. The information processing apparatus may also have means for determining simulated seismic data based on an earth model for the region of interest, a reflection model for the region of interest, and the selected shot points. The information processing apparatus may also have means for determining an objective function that represents a mismatch between the sparse seismic data and the simulated seismic data. The information processing apparatus may also have means for updating the reflection model using the objective function.

In some implementations, a computing system is provided that includes at least one processor, at least one memory, and one or more programs stored in the at least one memory, wherein the programs include instructions, which when executed by the at least one processor cause the computing system to receive seismic data for a region of interest. The seismic data may be acquired in a seismic survey. The programs may further include instructions to cause the computing system to determine sparse seismic data by selecting shot points in the acquired seismic data using statistical sampling. The programs may further include instructions to cause the computing system to determine simulated seismic data based on an earth model for the region of interest, a reflection model for the region of interest, and the selected shot points. The programs may further include instructions to cause the computing system to determine an objective function that represents a mismatch between the sparse seismic data and the simulated seismic data. The programs may further include instructions to cause the computing system to update the reflection model using the objective function.

In some implementations, a computer readable storage medium is provided, which has stored therein one or more programs, the one or more programs including instructions, which when executed by a processor, cause the processor to receive seismic data for a region of interest. The seismic data may be acquired in a seismic survey. The programs may further include instructions, which cause the processor to determine sparse seismic data by selecting shot points in the acquired seismic data using statistical sampling. The programs may further include instructions, which cause the processor to determine simulated seismic data based on an earth model for the region of interest, a reflection model for the region of interest, and the selected shot points. The programs may further include instructions, which cause the processor to determine an objective function that represents a mismatch between the sparse seismic data and the simulated seismic data. The programs may further include instructions, which cause the processor to update the reflection model using the objective function.

In some implementations, a method for processing data corresponding to a multi-dimensional region of interest is provided. The method may receive survey data for the multi-dimensional region of interest. The survey data may be acquired in an imaging procedure. The method may determine sparse survey data by selecting survey points in the acquired survey data using statistical sampling. The method may determine simulated survey data based on a velocity model for the multi-dimensional region of interest, a reflection model for the multi-dimensional region of interest, and the selected survey points. The method may determine an objective function that represents a mismatch between the sparse survey data and the simulated survey data. The method may update the reflection model for the multi-dimensional region of interest using the objective function.

In some implementations, an information processing apparatus for use in a computing system is provided, and includes means for receiving survey data for a multi-dimensional region of interest. The survey data may be acquired in an imaging procedure. The information processing apparatus may also have means for determining sparse survey data by selecting survey points from the acquired survey data using statistical sampling. The information processing apparatus may also have means for determining simulated survey data based on a velocity model for the multi-dimensional region of interest, a reflection model for the multi-dimensional region of interest, and the selected survey points. The information processing apparatus may also have means for determining an objective function that represents a mismatch between the sparse survey data and the simulated survey data. The information processing apparatus may also have means for updating the reflection model for the multi-dimensional region of interest using the objective function.

In some implementations, a computing system is provided that includes at least one processor, at least one memory, and one or more programs stored in the at least one memory, wherein the programs include instructions, which when executed by the at least one processor cause the computing system to receive survey data for a multi-dimensional region of interest. The survey data may be acquired in an imaging procedure. The programs may further include instructions to cause the computing system to determine sparse survey data by selecting survey points from the acquired survey data using statistical sampling. The programs may further include instructions to cause the computing system to determine simulated survey data based on a velocity model for the multi-dimensional region of interest, a reflection model for the multi-dimensional region of interest, and the selected survey points. The programs may further include instructions to cause the computing system to determine an objective function that represents a mismatch between the sparse survey data and the simulated survey data. The programs may further include instructions to cause the computing system to update the reflection model for the multi-dimensional region of interest using the objective function.

In some implementations, a computer readable storage medium is provided, which has stored therein one or more programs, the one or more programs including instructions, which when executed by a processor, cause the processor to receive survey data for a multi-dimensional region of interest. The survey data may be acquired in an imaging procedure. The programs may further include instructions, which cause the processor to determine sparse survey data by selecting survey points from the acquired survey data using statistical sampling. The programs may further include instructions, which cause the processor to determine simulated survey data based on a velocity model for the multi-dimensional region of interest, a reflection model for the multi-dimensional and the selected survey points. The programs may further include instructions, which cause the processor to determine an objective function that represents a mismatch between the sparse survey data and the simulated survey data. The programs may further include instructions, which cause the processor to update the reflection model for the multi-dimensional region of interest using the objective function.

In some implementations, the multi-dimensional region of interest is selected from the group consisting of a subterranean region, human tissue, plant tissue, animal tissue, solid volumes, substantially solid volumes, volumes of liquid, volumes of gas, volumes of plasma, and volumes of space near and/or outside the atmosphere of a planet, asteroid, comet, moon, or other body.

In some implementations, the multi-dimensional region of interest includes one or more volume types selected from the group consisting of a subterranean region, human tissue, plant tissue, animal tissue, solid volumes, substantially solid volumes, volumes of liquid, volumes of air, volumes of plasma, and volumes of space near and/or or outside the atmosphere of a planet, asteroid, comet, moon, or other body.

Second Migration Implementation

Figure 9:
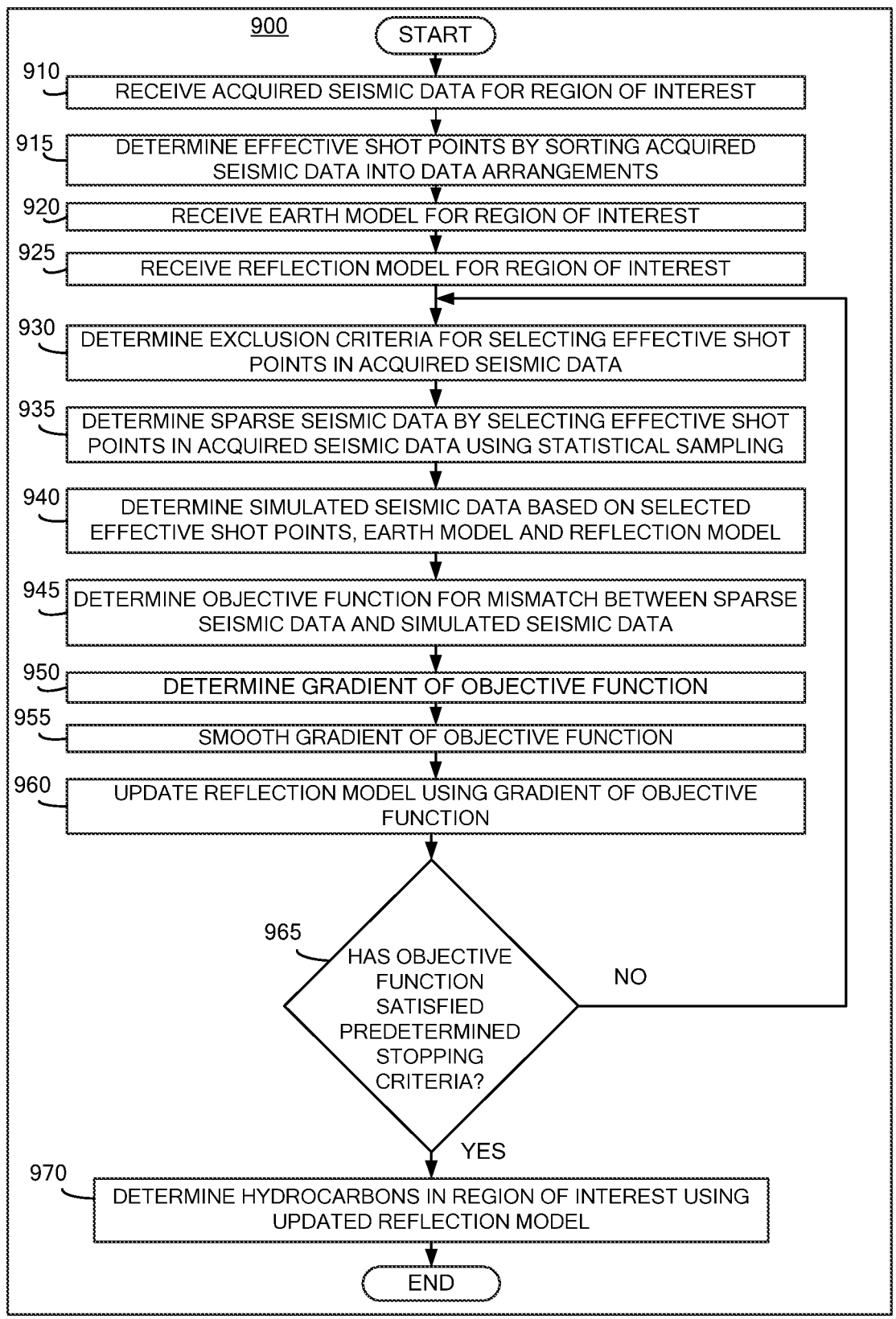
FIG. 9 illustrates a flow diagram of a method for processing seismic data in accordance with various implementations described herein.

FIG. 9 illustrates a flow diagram of a method 900 for processing seismic data in accordance with various implementations described herein. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted.

At block 910, acquired seismic data are received for a region of interest (i.e., "the received seismic data" and also called "observed seismic data"). For instance, the acquired seismic data may correspond to one or more shot points (also called "shot records") from a seismic survey as described in FIG. 5. A shot point may describe seismic data that is obtained from firing one or more seismic sources at a particular shot location during a seismic survey. The region of interest may include an area of the subsurface in the earth that may be of particular interest, such as for hydrocarbon production.

At block 915, the received seismic data may be sorted into one or more data arrangements for determining effective shot points and effective receiver locations. For instance, the received seismic data may be sorted into one or more receiver gathers (i.e., also called "common receiver gathers"). As such, a respective receiver location in a receiver gather may correspond to seismic data recorded from one, or a plurality of shot points during a seismic survey.

Using the principle of reciprocity, a respective receiver location in a receiver gather may become an effective shot point or effective source location in place of actual shot points used in a seismic survey. Furthermore, using the receiver gathers and the principle of reciprocity, the actual shot points or physical source locations may become effective receiver locations in place of the actual receiver locations that were used to record the seismic data.

At block 920, an earth model may be received for the region of interest (i.e., "the received earth model"). The received earth model may include elastic properties for specific regions in the subsurface of the earth. Elastic properties may include density, P-velocity (Vp) or velocity of the primary wave, S-velocity (Vs) or velocity of the shear wave, acoustic impedance, shear impedance, Poisson's ratio, elastic stiffness, elastic compliances, or a combination thereof. In one implementation, the earth model may be a velocity model that describes the propagation of seismic waves between reflection points in the region of interest.

In another implementation, the earth model may be obtained by performing a full-waveform inversion on the received seismic data from block 910.

At block 925, a reflection model may be received for the region of interest (i.e., "the received reflection model" or "the reflectivity model"). The received reflection model may describe the propagation or scattering of seismic waves in response to reflection interfaces inside the region of interest. For instance, the received reflection model may provide the boundaries of reflection interfaces inside the region of interest.

Furthermore, the reflection model may demonstrate rapid spatial variation in the region of interest, while the earth model may demonstrate slow spatial variation in the region of interest. As such, different wavelengths of seismic waves may be used to determine the spatial variation for either the earth model or the reflection model.

The received reflection model may describe one or more reflection events. A reflection event may describe how an incidental seismic wave interacts with a reflection interface in the subsurface, and reflection events may correspond to specific reflection properties. Reflection properties may include the time that a particular reflection occurs, the slope of a reflection interface, the curvature of a reflection interface and other properties corresponding to reflection events.

In one implementation, the received reflection model may be obtained using a reverse time migration algorithm. In the reverse time migration algorithm, seismic waves may propagate reflection events downward and upward through the subsurface using the earth model. The reverse time migration algorithm may use a partial or a complete selection of the effective shot points that correspond to the acquired seismic data from block 910. For more information regarding reverse time migration, see block 940 below.

In another implementation, the received reflection model may be obtained in an initial iteration of blocks 930-965 below. For instance, block 925 may be omitted from method 900 and an empty or zeroed reflection model may be used at blocks 930-965 in the initial iteration. The updated reflection model at block 960 may be used as the received reflection model in the next iteration of block 930-965.

At block 930, one or more exclusion criteria may be determined for sampling the acquired seismic data. The exclusion criteria may include one or more rules that provide for selecting or excluding effective shot points and their corresponding seismic data from an acquired seismic dataset. For instance, the exclusion criteria may limit the number of effective shot points that may be randomly or pseudo-randomly selected within a predetermined proximity of another effective shot point in a particular geographic area or survey area. In one implementation, the exclusion criteria may include an exclusion radius that provides a predetermined minimum distance between sampled effective shot points. The predetermined minimum distance may limit statistical sampling to effective shot points in the acquired seismic data that are outside a predetermined minimum distance from a previously selected effective shot point. If method 900 selects an invalid effective shot point (i.e., one that violates the exclusion criteria), method 900 may ignore that selection and randomly select another effective shot point from the acquired seismic data until a valid effective shot point is selected.

The exclusion radius may be determined based on one or more factors. For instance, the exclusion radius may be based on reducing the acquired seismic data down to a predetermined size. If a reduction in the acquired seismic data is desired (e.g., a sparse dataset that is 10% of the original size of the acquired seismic data), the exclusion radius may be determined such that the acquired seismic data is sampled to produce a predetermined number of effective shot points corresponding to the desired size of a sparse seismic dataset.

The exclusion radius may also be determined to achieve a predetermined sampling frequency of effective shot points in the inline and/or crossline directions of a seismic survey (i.e., to achieve a predetermined inline sampling or crossline sampling). This predetermined sampling frequency may be chosen to produce or prevent a non-aliased sparse seismic dataset. Aliasing may occur when the sampling frequency of a survey shot distribution is less than the Nyquist frequency of the pressure waves emitted by the seismic sources. In another implementation, the exclusion criteria may include using a grid of seismic cells to select effective shot points in the acquired seismic data. For instance, the acquired seismic data from block 910 may be divided into a grid of seismic data cells. The exclusion criteria may limit statistical sampling of the acquired seismic data to a predetermined number of effective shot points within a respective seismic cell in the grid (e.g., selecting a single effective shot point from a respective seismic cell in the grid).

At block 935, sparse seismic data may be determined from the acquired seismic data at 910 using statistical sampling. In statistical sampling, data points may be randomly or pseudo-randomly selected to provide an estimate of a larger dataset. For instance, effective shot points corresponding to the acquired seismic data may be randomly selected to produce sparse seismic data. In one implementation, the acquired seismic data may be sampled using a sampling frequency to prevent aliasing in the sparse seismic data.

Furthermore, the determined exclusion criteria from block 930 may be used to limit which effective shot points for the acquired seismic data may be sampled. Without using exclusion criteria, the statistical sampling of the acquired seismic data may result in a problematic dataset. In one situation, the sparse seismic data may have a disproportionate number of effective shot points selected from one survey region of the acquired seismic data, while selecting insufficient effective shot points in other regions of the acquired seismic data. In another situation, two or more effective shot points in the sparse seismic data may be closely-spaced together, which may provide little additional information to the method 900. Either situation may result in more iterations and added computational costs to satisfy one or more predetermined stopping criteria at block 965 below.

In one implementation, the exclusion criteria may include eliminating effective shot points that were already selected in a previous iteration of method 900 from the sampling process at block 935. Iterations may refer to repetitions of one or more of blocks 935-995 based on whether the objective function has satisfied one or more predetermined stopping criteria, such as convergence of the objective function. However, eliminating previously used effective shot points from the statistical sampling at block 935 may increase the number of unique effective shot points used in method 900, i.e., increasing the percentage of effective shot points from the original acquired seismic data that are used at least once in method 900.

In another implementation, selected effective shot points may be reused in different iterations. For instance, if a particular effective shot point is sampled to produce sparse seismic data in one iteration, the same effective shot point may be replaced or made available for use in the next or a future iteration. This may allow effective shot points and their corresponding seismic data to be used in multiple iterations in method 900. As such, the number of available effective shot points for sampling may remain constant.

In another implementation, the number of effective shot points sampled at block 935 may remain constant during subsequent iterations of method 900. This may result in a fixed size of the sparse seismic data for each iteration. Furthermore, the exclusion criteria, e.g., the exclusion radius, may remain the same between iterations in order to sample the same number of effective shot points as the previous iterations.

In another implementation, the number of effective shot points sampled at block 935 may be increased by a predetermined amount in subsequent iterations of method 900. As such, early iterations may have less computational costs than later iterations that sample more effective shot points of the acquired seismic data. As the number of selected effective shot points increase during method 900, the exclusion criteria may be updated accordingly. For instance, if the exclusion criteria include an exclusion radius, the predetermined minimum distance may be decreased in later iterations to provide for randomly selecting more effective shot points. If the exclusion criteria include a grid of seismic cells, the size of a respective seismic cell may be decreased to increase the number of selected effective shot points.

At block 940, simulated seismic data may be determined based on the selected effective shot points corresponding to the sparse seismic data, the received earth model, and the received reflection model. For instance, the simulated seismic data may be determined by performing a computer simulation of a seismic survey using the received earth model and the received reflection model. The simulated seismic data may be based on the Born approximation, where modelling the propagation of a seismic wave includes limiting the interaction between the seismic wave and a reflection interface or reflection point to a single instance. Furthermore, by using one or more selected effective shot points, a seismic wave may be forward modeled from the selected effective shot points through the subsurface to the effective receivers in a seismic acquisition system. The selected effective shot points that are used in the simulated seismic survey may be the same effective shot points that were selected for the sparse seismic data at block 935.

At block 945, an objective function is determined. The objective function may represent the mismatch between acquired seismic data and simulated seismic data based on the received reflection model. As such, the objective function may refer to the relationship between the acquired seismic data and the simulated seismic data, as described in Equation 5 below, and/or the measured mismatch between the acquired seismic data and the simulated seismic data.

Furthermore, the objective function may provide a solution to a seismic inverse problem, such as one used for reverse time migration. In reverse time migration, a forward modeling operator $F_v(r)$ using the received earth model may map the received reflection model over an inversion domain $\Omega$ to a data domain, thereby producing forward modeled data. To obtain a solution for the inverse problem, reverse time migration may include an optimization process to minimize the mismatch $f(r)$ between the forward modeled data and observed seismic data, as described by the objective function. For instance, the objective function may be a least-squares objective function that may be expressed by the following equation:

$$\min f(r) = \frac{1}{2}\sum_S \sum_R \|F_v(r) - d_{acq}\|^2 \quad \text{Equation 5}$$

where r includes reflection parameters from the received reflection model, S refers to selected effective shot points from a seismic survey, R refers to selected effective receivers from a seismic survey, $F_v(r)$ is the forward modeling operator that maps the seismic response of the subsurface using the received earth model and the received reflection model, and $d_{acq}$ is the observed seismic data. $F_v(r)$ may be the simulated seismic data from block 940 and $d_{acq}$ may be the sparse seismic data from block 935. S may include the effective shot points selected using statistical sampling at block 935. While a least-squares norm is used in Equation 5, other objective functions may use norms besides the least-squares norm, such as an absolute norm, a student-t norm, a triangular norm, and any other applicable norm functions for determining the mismatch between the observed seismic data and the simulated seismic data.

In one implementation, the objective function may be a regularized objective function. Regularization may be used to stabilize the solution of an objective function for a seismic inverse problem by reducing the size of the possible null space for the seismic inverse problem, which may reduce the amount of possible solutions. Regularization may include introducing a priori information into an objective function. A priori information may include inferences about an inverse problem that may be made based on the particular physics of the problem, such as the natural bedding process of the subsurface. In one implementation, a regularized objection function may be expressed by the following equation:

$$\min f(r) = \frac{1}{2}\sum_S \sum_R \|F_v(r) - d_{acq}\|^2 + Reg(r) \quad \text{Equation 6}$$

where r includes properties from the reflection model, $F_v(r)$ is the forward-modeled seismic response based on the received earth model and the received reflection model, $d_{acq}$ is the observed seismic data, S refers to selected effective shot points from a seismic survey, R refers to selected effective receivers from a seismic survey, and Reg(r) is regularization function based on the reflection model and a priori information. Reg(r) may be specified using the following equation:

$$Reg(r) = \frac{1}{2}\int_\Omega h[\|\nabla r\|^2] \quad \text{Equation 7}$$

where $\Omega$ is the seismic inversion domain, r includes parameters of the received reflection model, $\nabla r$ is the spatial gradient vector of the model parameter r, and h describes a compactly supported infinitely differentiable function.

At block 950, the gradient of the objective function may be determined. For instance, in reverse time migration, the gradient of the objective function g(r) may be expressed by the following equation:

$$g(r) = \nabla f(r) \quad \text{Equation 8}$$

The gradient g(r) may be computed by any applicable method, such as the adjoint-state formulation. For instance, in an adjoint-state formulation, state variables (e.g., the seismic wavefield variables) may be computed by forward modeling the seismic response of the subsurface. Then, an adjoint source may be computed for the state variables and the objective function. Next, the adjoint state variables (e.g., the seismic wavefields from the adjoint source) may be computed by backward modeling the seismic wavefields. Finally, the gradient of the objective function may be computed using the state variables and the adjoint state variables.

At block 955, the gradient of the objective function may be smoothed (i.e., "the updated gradient of the objective function" or "the pre-conditioned gradient"). For instance, the gradient of the objective function based on the sparse seismic data and the simulated seismic data may include missing or inaccurate values from using a sparse portion of the acquired seismic data from block 910. As such, smoothing the gradient may remove "source foot-print" effects. An unsmoothed gradient may also be prone to converging to local minima at block 965 below. The gradient may be smoothed at block 955 using Tikhonov regularization, a total variation regulation, or any other type of smoothing process. Smoothing parameters for block 955 may be based on the spacing of selected effective shot points in the sparse seismic data or the source frequency bandwidth as used in the seismic survey to obtain the acquired seismic data.

At block 960, the received reflection model may be updated using the gradient of the objective function from blocks 950 or 955. The received reflection model may be updated iteratively, such as according to the rule $r_{k+1} = r_k + a_k p_k$, where $r_k$ is the received reflection model at iteration k, $a_k$ is the step size or length determined by a line search procedure with the search direction $p_k$, and $r_{k+1}$ is the updated reflection model. The search direction $p_k$ may be selected using the updated gradient of the objective function and the selected optimization technique that is being used, such as one of steepest descent, conjugate gradient, or Newton/quasi-Newton directions. The step length corresponds to the amount of change for model parameters in the updated reflection model.

The received earth model from block 920 may be a background model in iterations of block 930-965. As such, while the received reflection model may be updated during a particular iteration, the received earth model may remain constant or unchanged between iterations.

At block 965, it may be determined whether the objective function has satisfied one or more predetermined stopping criteria. For instance, the objective function may be analyzed for whether it has converged to a value or stopped decreasing from one iteration to the next iteration. The predetermined stopping criteria may be a specified threshold where convergence occurs, such as when the difference between the sparse seismic data from block 935 and the simulated seismic data from block 940 is below the specified threshold. The specified threshold may be submitted by a user. The specified threshold may be based on the noise level of the received seismic data. In another instance, the specified threshold may be a point determined by a user where method 900 introduces geologically implausible features into the gradient from block 950, such as due to method 900 attempting to fit the seismic data to noise. Specified thresholds may also include quality control (QC) criteria, such as the flatness of the image gather.

If the objective function satisfies the predetermined stopping criteria, the process may proceed to block 970. If the objective function fails to satisfy the predetermined stopping criteria, the process may return to block 930 to repeat one or more of blocks 930-965 using the updated reflection model from block 960 in place of the received reflection model from block 925.

At block 970, the updated reflection model may be used to determine the presence of hydrocarbons in the region of interest. For instance, the updated reflection model may be used to facilitate hydrocarbon exploration or production. In one implementation, a petrophysical model may be estimated based on a final reflection model from block 965. The petrophysical model may include various petrophysical properties that describe the region of interest such as the amount of shale (Vshale), the elastic moduli of composite rock or the density of the solid phase of rock. For more information regarding hydrocarbon exploration or production, see the section titled OIL OPERATION above.

In some implementations, a method for seismic data processing is provided. The method may receive seismic data for a region of interest. The seismic data may be acquired in a seismic survey. The method may sort the acquired seismic data into receiver gathers. The receiver gathers may describe a single shot point or a plurality of shot points that are associated with a respective receiver location. The method may determine a plurality of effective shot points for the region of interest using the receiver gathers. The method may determine sparse seismic data by selecting effective shot points in the acquired seismic data using statistical sampling. The method may determine simulated seismic data based on an earth model for the region of interest, a reflection model for the region of interest, and the selected effective shot points. The method may determine an objective function that represents a mismatch between the sparse seismic data and the simulated seismic data. The method may update the reflection model using the objective function.

In some implementations, the method may determine a gradient of the objective function. The method may also update the gradient of the objective function. The method may update the reflection model using the updated gradient. The method may also iteratively update the reflection model and the gradient of the objective function until the objective function satisfies predetermined stopping criteria or converges. Updating the gradient of the objective function may include smoothing the gradient of the objective function.

In some implementation, the reflection model may be obtained using a reverse time migration algorithm. The reflection model may be obtained in an initial iteration of updating the reflection model based on the objective function. The reflection model may describe the propagation of seismic waves in response to reflection interfaces in the region of interest. One of the selected effective shot points may have been selected in a previous iteration for updating the reflection model. One of the selected effective shots points may have been excluded from being selected in a future iteration for updating the reflection model. The objective function may correspond to a least squares norm. The earth model may be a velocity model that describes the propagation of seismic waves between reflection points in the region of interest. The earth model may include one or more elastic properties, such as density, P-velocity (Vp), S-velocity (Vs), acoustic impedance, shear impedance, Poisson's ratio, elastic stiffness, or elastic compliances. The reflection model may include one or more reflection properties, such as the time of a reflection, the slope of a reflection interface, or the curvature of a reflection interface. The method may use the updated reflection model to facilitate hydrocarbon exploration or production.

In some implementations, an information processing apparatus for use in a computing system is provided, and includes means for receiving seismic data for a region of interest. The seismic data may be acquired in a seismic survey. The information processing apparatus may also have means for sorting the acquired seismic data into receiver gathers. The receiver gathers may describe a single shot point or a plurality of shot points that are associated with a respective receiver location. The information processing apparatus may also have means for determining a plurality of effective shot points for the region of interest using the receiver gathers. The information processing apparatus may also have means for determining sparse seismic data by selecting effective shot points from the acquired seismic data using statistical sampling. The information processing apparatus may also have means for determining simulated seismic data based on an earth model for the region of interest, a reflection model for the region of interest, and the selected effective shot points. The information processing apparatus may also have means for determining an objective function that represents a mismatch between the sparse seismic data and the simulated seismic data. The information processing apparatus may also have means for updating the reflection model using the objective function.

In some implementations, a computing system is provided that includes at least one processor, at least one memory, and one or more programs stored in the at least one memory, wherein the programs include instructions, which when executed by the at least one processor cause the computing system to receive seismic data for a region of interest. The seismic data may be acquired in a seismic survey. The programs may further include instructions to cause the computing system to sort the acquired seismic data into receiver gathers. The receiver gathers may describe a single shot point or a plurality of shot points that are associated with a respective receiver location. The programs may further include instructions to cause the computing system to determine a plurality of effective shot points for the region of interest using the receiver gathers. The programs may further include instructions to cause the computing system to determine sparse seismic data by selecting effective shot points in the acquired seismic data using statistical sampling. The programs may further include instructions to cause the computing system to determine simulated seismic data based on an earth model for the region of interest, a reflection model for the region of interest, and the selected effective shot points. The programs may further include instructions to cause the computing system to determine an objective function that represents a mismatch between the sparse seismic data and the simulated seismic data. The programs may further include instructions to cause the computing system to update the reflection model using the objective function.

In some implementations, a computer readable storage medium is provided, which has stored therein one or more programs, the one or more programs including instructions, which when executed by a processor, cause the processor to receive seismic data for a region of interest. The seismic data may be acquired in a seismic survey. The programs may further include instructions, which cause the processor to sort the acquired seismic data into receiver gathers. The receiver gathers may describe a single shot point or a plurality of shot points that are associated with a respective receiver location. The programs may further include instructions, which cause the processor to determine a plurality of effective shot points for the region of interest using the receiver gathers. The programs may further include instructions, which cause the processor to determine sparse seismic data by selecting effective shot points in the acquired seismic data using statistical sampling. The programs may further include instructions, which cause the processor to determine simulated seismic data based on an earth model for the region of interest, a reflection model for the region of interest, and the selected effective shot points. The programs may further include instructions, which cause the processor to determine an objective function that represents a mismatch between the sparse seismic data and the simulated seismic data. The programs may further include instructions, which cause the processor to update the reflection model using the objective function.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hard-wired links, wireless links, or combinations thereof. The distributed computing environments may span multiple continents and multiple vessels, ships or boats. In a distributed computing environment, program modules may be located in both local and remote computer storage media including memory storage devices.

Figure 8:
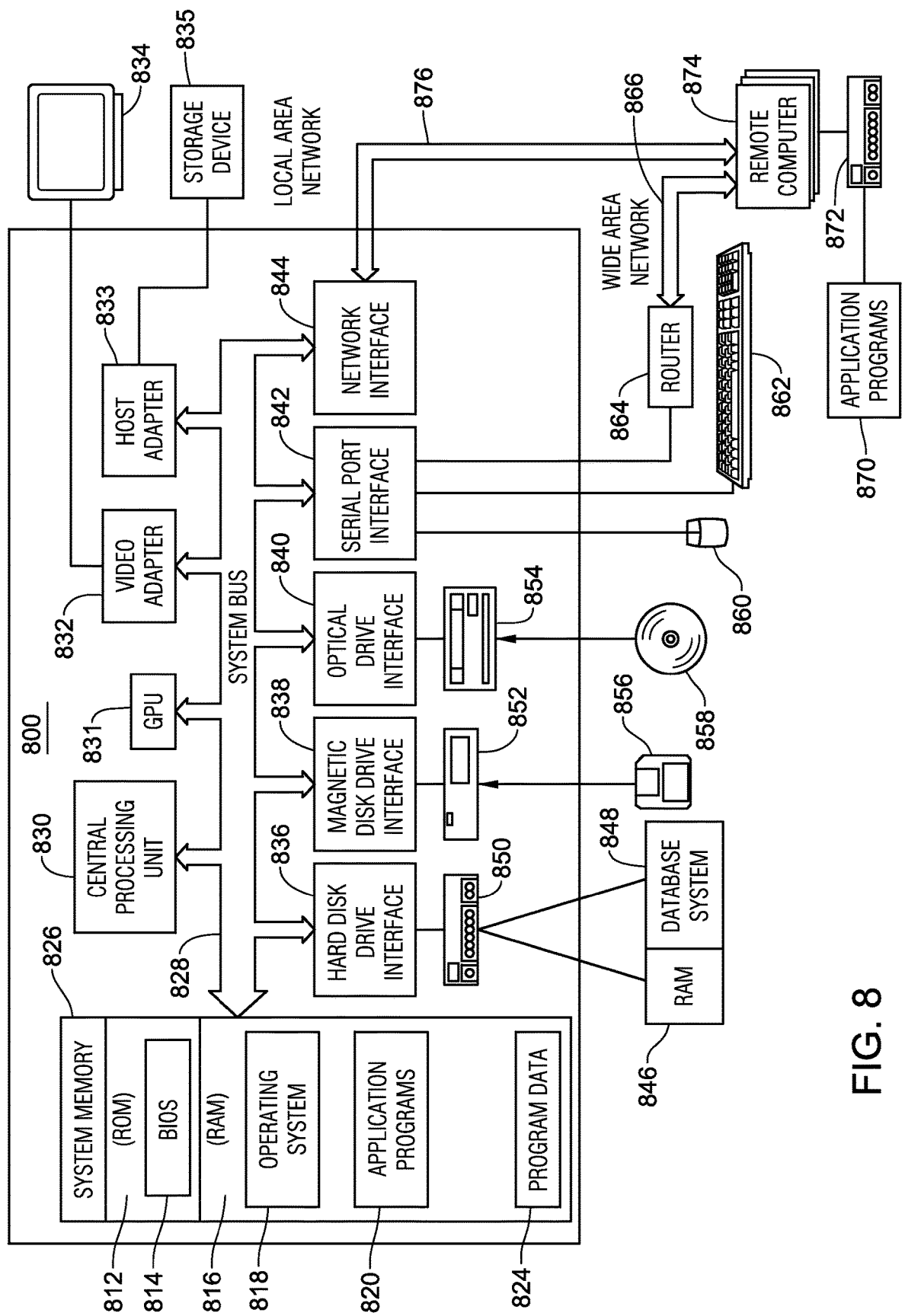
FIG. 8 illustrates a computer system in which the various technologies and techniques described herein may be incorporated and practiced.

FIG. 8 illustrates a schematic diagram of a computing system 800 in which the various technologies described herein may be incorporated and practiced. Although the computing system 800 may be a conventional desktop or a server computer, as described above, other computer system configurations may be used.

The computing system 800 may include a central processing unit (CPU) 830, a system memory 826, a graphics processing unit (GPU) 831 and a system bus 828 that couples various system components including the system memory 826 to the CPU 830. Although one CPU is illustrated in FIG. 8, it should be understood that in some implementations the computing system 800 may include more than one CPU. The GPU 831 may be a microprocessor specifically designed to manipulate and implement computer graphics. The CPU 830 may offload work to the GPU 831. The GPU 831 may have its own graphics memory, and/or may have access to a portion of the system memory 826. As with the CPU 830, the GPU 831 may include one or more processing units, and the processing units may include one or more cores. The system bus 828 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 826 may include a read-only memory (ROM) 812 and a random access memory (RAM) 816. A basic input/output system (BIOS) 814, containing the basic routines that help transfer information between elements within the computing system 800, such as during start-up, may be stored in the ROM 812.

The computing system 800 may further include a hard disk drive 850 for reading from and writing to a hard disk, a magnetic disk drive 852 for reading from and writing to a removable magnetic disk 856, and an optical disk drive 854 for reading from and writing to a removable optical disk 858, such as a CD ROM or other optical media. The hard disk drive 850, the magnetic disk drive 852, and the optical disk drive 854 may be connected to the system bus 828 by a hard disk drive interface 836, a magnetic disk drive interface 838, and an optical drive interface 840, respectively. The drives and their associated computer-readable media may provide nonvolatile storage of computer-readable instructions, data structures, program modules and other data for the computing system 800.

Although the computing system 800 is described herein as having a hard disk, a removable magnetic disk 856 and a removable optical disk 858, it should be appreciated by those skilled in the art that the computing system 800 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EE- PROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 800. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 800 may also include a host adapter 833 that connects to a storage device 835 via a small computer system interface (SCSI) bus, a Fiber Channel bus, an eSATA bus, or using any other applicable computer bus interface. Combinations of any of the above may also be included within the scope of computer readable media.

A number of program modules may be stored on the hard disk 850, magnetic disk 856, optical disk 858, ROM 812 or RAM 816, including an operating system 818, one or more application programs 820, program data 824, and a database system 848. The application programs 820 may include various mobile applications ("apps") and other applications configured to perform various methods and techniques described herein. The operating system 818 may be any suitable operating system that may control the operation of a networked personal or server computer, such as Windows® XP, Mac OS® X, Unix-variants (e.g., Linux® and BSD®), and the like.

A user may enter commands and information into the computing system 800 through input devices such as a keyboard 862 and pointing device 860. Other input devices may include a microphone, joystick, game pad, satellite dish, scanner, or the like. These and other input devices may be connected to the CPU 830 through a serial port interface 842 coupled to system bus 828, but may be connected by other interfaces, such as a parallel port, game port or a universal serial bus (USB). A monitor 838 or other type of display device may also be connected to system bus 828 via an interface, such as a video adapter 832. In addition to the monitor 838, the computing system 800 may further include other peripheral output devices such as speakers and printers.

Further, the computing system 800 may operate in a networked environment using logical connections to one or more remote computers 878. The logical connections may be any connection that is commonplace in offices, enterprise-wide computer networks, intranets, and the Internet, such as local area network (LAN) 876 and a wide area network (WAN) 866. The remote computers 874 may be another a computer, a server computer, a router, a network PC, a peer device or other common network node, and may include many of the elements describes above relative to the computing system 800. The remote computers 874 may also each include application programs 870 similar to that of the computer action function.

When using a LAN networking environment, the computing system 800 may be connected to the local network 876 through a network interface or adapter 844. When used in a WAN networking environment, the computing system 800 may include a router 864, wireless router or other means for establishing communication over a wide area network 866, such as the Internet. The router 864, which may be internal or external, may be connected to the system bus 828 via the serial port interface 842. In a networked environment, program modules depicted relative to the computing system 800, or portions thereof, may be stored in a remote memory storage device 835. It will be appreciated that the network connections shown are merely examples and other means of establishing a communications link between the computers may be used.

The network interface 844 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 874.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or sub-surface region of interest may be collected and processed, e.g., medical imaging techniques such as tomography, ultrasound, MRI and the like for human tissue; radar, sonar, and LIDAR imaging techniques; and other appropriate three-dimensional imaging problems.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

What is claimed is:

1. A method for seismic data processing, comprising:
   receiving seismic data for a region of interest, wherein the seismic data were acquired in a seismic survey;
   determining, using a processor, sparse seismic data by selecting shot points in the acquired seismic data using statistical sampling, wherein determining the sparse seismic data comprises determining at least one exclusion criterion that includes one or more rules for selecting the shot points in the acquired seismic data based on a location of an individual shot point relative to other shot points, wherein the shot points are selected based on the at least one exclusion criterion, and wherein other shot points not selected based on the at least one exclusion criterion;
   determining, using the processor, simulated seismic data based at least in part on an earth model for the region of interest, a reflection model for the region of interest, and the selected shot points;
   determining, using the processor, an objective function that represents a mismatch between the simulated seismic data and the sparse seismic data;
   updating, using the processor, the reflection model based at least in part on the objective function; and
   determining, using the processor, a presence of a hydrocarbon in the region of interest based at least in part on the updated reflection model.

2. The method of claim 1, wherein updating the reflection model comprises:
   determining a gradient of the objective function;
   updating the gradient of the objective function; and
   updating the reflection model using the updated gradient.

3. The method of claim 2, wherein updating the reflection model further comprises iteratively updating the reflection model and the gradient of the objective function until the objective function satisfies predetermined stopping criteria or converges.

4. The method of claim 2, wherein updating the gradient of the objective function comprises smoothing the gradient of the objective function.

5. The method of claim 1, wherein the reflection model was obtained using a reverse time migration algorithm.

6. The method of claim 1, wherein the reflection model was obtained in an initial iteration of updating the reflection model based at least in part on the objective function.

7. The method of claim 1, wherein the reflection model describes the propagation of seismic waves in response to reflection interfaces in the region of interest.

8. The method of claim 1, wherein at least one of the selected shot points was selected in a previous iteration for updating the reflection model.

9. The method of claim 1, wherein at least one of the selected shot points is excluded from being selected in a future iteration for updating the reflection model.

10. The method of claim 1, wherein the objective function corresponds to a least squares norm.

11. The method of claim 1, further comprising visualizing the updated reflection model.

12. The method of claim 1, further comprising generating the reflection model using a reverse time migration algorithm.

13. The method of claim 1, wherein the at least one exclusion criterion comprises an exclusion radius that provides a predetermined minimum distance between the selected shot points in the sparse seismic data.

14. The method of claim 1, wherein determining the at least one exclusion criterion comprises dividing the acquired seismic data into a grid of seismic data cells.

15. The method of claim 1, wherein the earth model is a velocity model that describes the propagation of seismic waves between reflection points in the region of interest.

16. The method of claim 1, wherein the earth model comprises one or more of the following elastic properties:
    density;
    P-velocity (Vp);
    S-velocity (Vs);
    acoustic impedance;
    shear impedance;
    Poisson's ratio;
    elastic stiffness;
    elastic compliances; or
    a combination thereof.

17. The method of claim 1, wherein the reflection model comprises one or more of the following reflection properties:
    the time of a reflection,
    the slope of a reflection interface,
    the curvature of a reflection interface; or
    a combination thereof.

18. A method for seismic data processing, comprising:
    receiving seismic data for a region of interest, wherein the seismic data were acquired in a seismic survey;
    sorting, using a processor, the acquired seismic data into one or more receiver gathers, wherein the receiver gathers describe a single shot point or a plurality of shot points that are associated with a respective receiver location;
    determining, using the processor, a plurality of effective shot points for the region of interest using the one or more receiver gathers;
    determining, using the processor, sparse seismic data by selecting effective shot points using statistical sampling, wherein determining the sparse seismic data comprises determining at least one exclusion criterion that provides one or more rules for selecting the effective shot points from the plurality of effective shot points, wherein at least one of the one or more rules is based on a spatial location of the an individual effective shot point relative to other effective shot points, wherein the selected effective shot points are selected based on the at least one exclusion criterion, and wherein other effective shot points not selected based on the at least one exclusion criterion;
    determining, using the processor, simulated seismic data based at least in part on an earth model for the region of interest, a reflection model for the region of interest, and the selected effective shot points;

determining, using the processor, an objective function that represents a mismatch between the simulated seismic data and the sparse seismic data;

updating, using the processor, the reflection model based at least in part on the objective function; and determining, using the processor, a presence of a hydrocarbon in the region of interest based at least in part on the updated reflection model.

19. The method of claim 18, wherein updating the earth model comprises:

determining a gradient of the objective function;
updating the gradient of the objective function; and
updating the reflection model using the updated gradient.

20. The method of claim 18, wherein one of the effective shot points corresponds to a respective receiver location in the receiver gathers.

21. A method, comprising:

receiving survey data for a multi-dimensional region of interest, wherein the survey data were acquired in an imaging procedure;

determining, using a processor, sparse survey data by selecting survey points from the acquired survey data using statistical sampling, wherein determining the sparse seismic data comprises determining at least one exclusion criterion that provides one or more rules for selecting the shot points in the acquired seismic data, wherein at least one of the one or more rules is based on a spatial location of an individual shot point relative to other shot points, wherein the selected shot points are selected based on the at least one exclusion criterion, and wherein other shot points not selected based on the at least one exclusion criterion;

determining, using the processor, simulated survey data based at least in part on a velocity model for a multi-dimensional region of interest, a reflection model for the multi-dimensional region of interest, and the selected survey points;

determining, using the processor, an objective function that represents a mismatch between the simulated survey data and the sparse survey data;

updating, using the processor, the reflection model based at least in part on the objective function; and determining, using the processor, a presence of a hydrocarbon in the region of interest based at least in part on the updated reflection model.

* * * * *

UNITED STATES PATENT AND TRADEMARK OFFICE
CERTIFICATE OF CORRECTION

PATENT NO. : 10,739,478 B2
APPLICATION NO. : 15/035884
DATED : August 11, 2020
INVENTOR(S) : Richard T. Coates et al.

It is certified that error appears in the above-identified patent and that said Letters Patent is hereby corrected as shown below:

On the Title Page

Item (72) Inventors should read:
Richard T. Coates, Katy, TX;
Darrell Coles, Katy, TX;
Wei Dai, Sugar Land, TX;
Kun Jiao, Katy, TX;
Alan G. Teague, Houston, TX;

Signed and Sealed this
Twenty-second Day of December, 2020

Andrei Iancu
*Director of the United States Patent and Trademark Office*